United States Patent [19]

Wrench, Jr. et al.

[11] Patent Number: 4,837,830
[45] Date of Patent: Jun. 6, 1989

[54] MULTIPLE PARAMETER SPEAKER RECOGNITION SYSTEM AND METHODS

[75] Inventors: Edwin H. Wrench, Jr., San Diego, Calif.; Robert Wohlford, Germantown, Md.; Joe Naylor, San Diego, Calif.

[73] Assignee: ITT Defense Communications, A Division of ITT Corporation, Nutley, N.J.

[21] Appl. No.: 3,971

[22] Filed: Jan. 16, 1987

[51] Int. Cl.$^4$ .............................................. G10L 5/06
[52] U.S. Cl. ...................................... 381/42; 381/41; 364/513.5
[58] Field of Search ...................... 381/42, 43, 41, 44, 381/45, 46, 47, 48, 49, 50; 364/513.5, 513

[56] References Cited

U.S. PATENT DOCUMENTS

| | | | |
|---|---|---|---|
| 4,032,711 | 6/1977 | Sambur | 381/42 |
| 4,092,493 | 5/1978 | Rabiner et al. | 381/42 |
| 4,405,838 | 9/1983 | Nitta et al. | 381/42 |
| 4,624,008 | 11/1986 | Vensko et al. | 381/43 |
| 4,718,093 | 1/1988 | Brown | 381/43 |

*Primary Examiner*—William M. Shoop, Jr.
*Assistant Examiner*—Brian Young

*Attorney, Agent, or Firm*—Robert A. Walsh; Thomas N. Twomey; Mary C. Werner

[57] ABSTRACT

An apparatus operates to identify the speech signal of an unknown speaker as one of a finite number of speakers. Each speaker is modeled and recognized with any example of their speech. The input to the system is analog speech and the output is a list of scores that measure how similar the input speaker is to each of the speakers whose models are stored in the system. The system includes front end processing means which is responsive to the speech signal to provide digitized samples of the speech signal at an output which are stored in a memory. The stored digitized samples are then retrieved and divided into frames. The frames are processed to provide a series of speech parameters indicative of the nature of the speech content in each of the frames. The processor for producing the speech parameters is coupled to either a speaker modeling means, whereby a model for each speaker is provided and consequently stored, or a speaker recognition mode, whereby the speech parameters are again processed with current parameters and compared with the stored parameters during each speech frame. The comparison is accomplished over a predetermined number of frames whereby a favorable comparison is indicative of a known speaker for which a model is stored.

18 Claims, 19 Drawing Sheets

MULTIPLE PARAMETER SPEAKER RECOGNITION SYSTEM AND METHODS

The Government has rights in this invention pursuant to Contract No. F30602-81-C-0134 awarded by the Department of the Air Force.

BACKGROUND OF THE INVENTION

This invention relates to a speaker recognition system and more particularly to a system which is capable of identifying an unknown talker or speaker as being one of a finite number of speakers.

As one will understand, the art of speech recognition in general has been vastly developed within the last few years and speech recognition systems have been employed in many forms. The concept of recognizing speech recognizes that the information obtained in the spoken sound can be utilized directly to activate a computer or other means.

Essentially, the prior art understood that a key element in recognizing information in a spoken sound is the distribution of the energy with frequency. The format frequencies which are those at which the energy peaks are particularly important. The format frequencies are the acoustic resonances of the mouth cavity and are controlled by the tongue, jaw and lips. For a human listener the termination of the first two or three format frequencies is usually enough to characterize the sound. In this manner machine recognizers of the prior art included some means of determining the amplitude spectrum of the incoming speech signal. This first step in speech recognition is referred to as preprocessing as it transforms the speech signal into features or parameters that are recognizable and reduces the data flow to manageable proportions.

In regard to such, one means of accomplishing this is the measurement of the zero crossing rate of the signal in several broad frequency bands to give an estimate of the format frequencies in these bands. Another means is representing the speech signal in terms of the parameters of the filter whose spectrum best fits that of the input speech signal. This technique is known as linear predictive coding (LPC). Linear predictive coding or LPC has gained popularity because of its efficiency, accuracy and simplicity. The recognition features extracted from speech are typically averaged over 10 to 20 milliseconds then sampled 50 to 100 times per second.

At this point, the data which is digitized and the ensuing recognition steps are performed by a programmable digital processor. In any event, there are many problems associated with the concept of recognizing speech in regard to the information content. In any event, as one can ascertain, the general problem of speech recognition has been described in many articles and patents. Apart from the problem of recognizing speech in general, another major concern is to recognize or verify a speaker. Speaker recognition is a generic term which refers to a system which discriminates between speakers according to their voice characteristics. Speaker recognition can involve speaker identification or speaker verification. Speaker identification is a system which can classify an unlabeled voice as belonging to one of a set of N reference speakers. Speaker verification implies the determination that an unlabeled voice belongs to a specific reference speaker. For a description of both speaker recognition systems and speech recognition system reference is made to the November, 1985 issue of the Proceedings of the I.E.E.E., Volume 73, No. 11, pages 1537-1696. In particular an article entitled "Speaker Recognition-Identifying People By Their Voices", by G. R. Doddington. See also Linear Prediction of Speech, Spring-Verlag (1976) by J. D. Markal and A. H. Gray for additional background. In this respect a system which can identify unknown speakers in real time using a small sample of their speech has great applicability.

Essentially, the applicability or usefulness of such a system should be apparent in regard to military systems whereby only authorized or identified speakers would be allowed to communicate with certain other authorized or identified individuals. In such a system an operator will be able to specify those speakers who are of interest at a particular time. Such a system could then route to the operator only speech that it identifies as spoken by specified talkers.

Such systems may also be used in security applications as recognizing certain individual's voices to gain access to premises, identification and so on. Essentially, as one can ascertain, any such system prior to executing a recognition task will have to obtain samples of the speech from each of the talkers that may later be recognized.

A major aspect or specification for any such system is that it shall correctly identify speakers whose training data has been preprocessed and using a small percentage of time in order to accomplish such recognition. Thus in regard to any such system it is immediately ascertained that there is application for speaker recognition in many different systems that attempt to identify the users of the system by their voices. In certain applications a system which can identify particular speakers would identify current speakers which are using a communications channel and therefore selectively route speech from selected authorized talkers to the user.

In this manner the system will serve to automatically identify and recognize individual speakers and to therefore under certain considerations either indicate that the speaker is authorized to use a certain communication channel or that the speaker is one whose presence in a conference or conversation is authorized. Hence as one can ascertain, there are many uses for speaker recognition systems which presently exist. As one can also ascertain, the problems of individual speaker recognition is a substantial problem and while there have been many attempts to achieve such in the prior art, none of these attempts have been successful in that such systems have been extremely complicated and are associated with low accuracy.

It is therefore an object of the present invention to provide an improved multiple parameter speaker recognition system which system exhibits a high accuracy and which system is capable of identifying any one of a plurality of finite authorized speakers to thereby afford speaker recognition to authorized system users.

A further object of this invention is to provide apparatus and methods used to identify an unknown talker as one of a finite number of speakers. The apparatus and methods allow the speaker to be modeled and recognized with any examples of their speech as the speakers do not have to repeat a particular phrase in order to achieve recognition.

Hence a further object of the present invention is to therefore provide a text independent speaker recognition system.

BRIEF DESCRIPTION OF THE PREFERRED EMBODIMENT

Speaker recognition apparatus for identifying the speech signal of an unknown speaker as one of a finite number of speakers to thereafter enable the identification of said speaker comprising front end processing means responsive to said speech signal to provide digitized samples of said speech at an output, storage means coupled to said processing means and having a first plurality of storage locations for storing said digitized samples, logic means included in said front end processing means and coupled to said storage means and responsive to said stored digitized samples to divide said samples into frames each frame containing a given number of samples, signal processing means included in said front end processing means and coupled to said logic means and responsive to said samples in said frames to provide at an output a series of speech parameters indicative of the nature of said speech content in each of said frames and including means for determining which of said frames contain speech by providing a smoothed histogram of the input energy in each of said frames to determine which of said frames contain speech according to said input energy, speaker modeling means coupled to said output of said signal processing means in a first selectable mode and operative to provide a model for said speaker in said first mode, said signal modeling means including processor means responsive to said speech parameters within each speech frame to provide a covariance matrix indicative of said speech parameters and coupled to said storage means to store at a second plurality of locations said matrix to employ said matrix as a model during a second selectable mode of operation, speaker recognition means coupled to the output of said signal processing means in a second selectable mode operative to identify a speaker whose model has been stored in said first mode and responsive to said parameters including comparison means for comparing the average current parameter with said stored speaker models during said speech frames as provided by said front end processing means, over a predetermined number of frames whereby a favorable comparison is indicative of a known speaker for which a model is stored and, means coupled to said output of said signal processing means for selecting either said first or second modes.

DETAILED DESCRIPTION OF THE FIGURES

Figure 1:
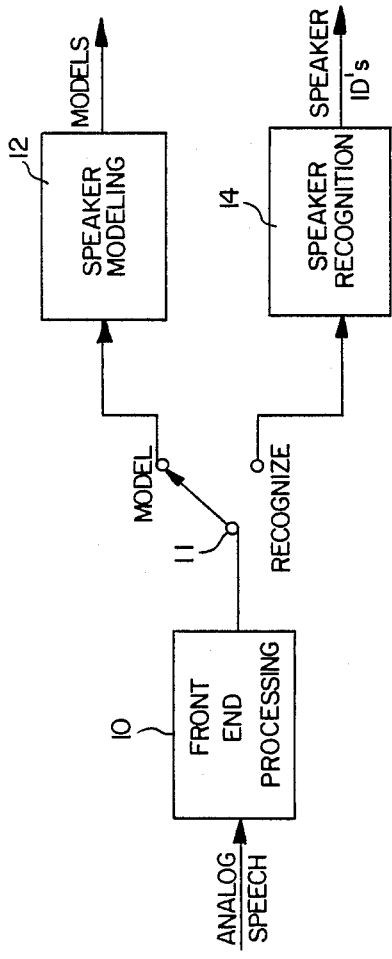
FIG. 1 is a simple block diagram depicting a multiple parameter speaker recognition system according to this invention.

Referring to FIG. 1, there is shown the three main components which are necessary in implementing a speaker recognition system according to this invention.

As one can ascertain from FIG. 1, analog speech is directed to a front end processing circuit 10 whereby the speech, as will be explained, is processed according to particular algorithms which serve to determine or recognize speech. As seen schematically in FIG. 1, the output of the front end processing unit 10 is coupled to a switch 11. The switch 11 is capable of being positioned in a first position or mode designated as MODEL or switched to a second position or mode designated as a RECOGNIZE. As one will ascertain in the MODEL position, processed output speech from processor 10 is directed to a speaker modeling system 12 whereby the system 12 functions to provide various characteristics or a model associated with a particular speaker and to store the model in memory for further utilization by the system. The system also contains a speaker recognition module 14 whereby when the output from the front end processing unit 10 is coupled to the recognize input, the system operates to determine a speaker's identity.

The first step to be performed by the front end processing circuit 10 employed in the speaker recognition system is to digitize the input analog speech and to produce frames of speech parameters. Essentially, this function is performed by the front end processing unit 10 of FIG. 1.

Figure 2:
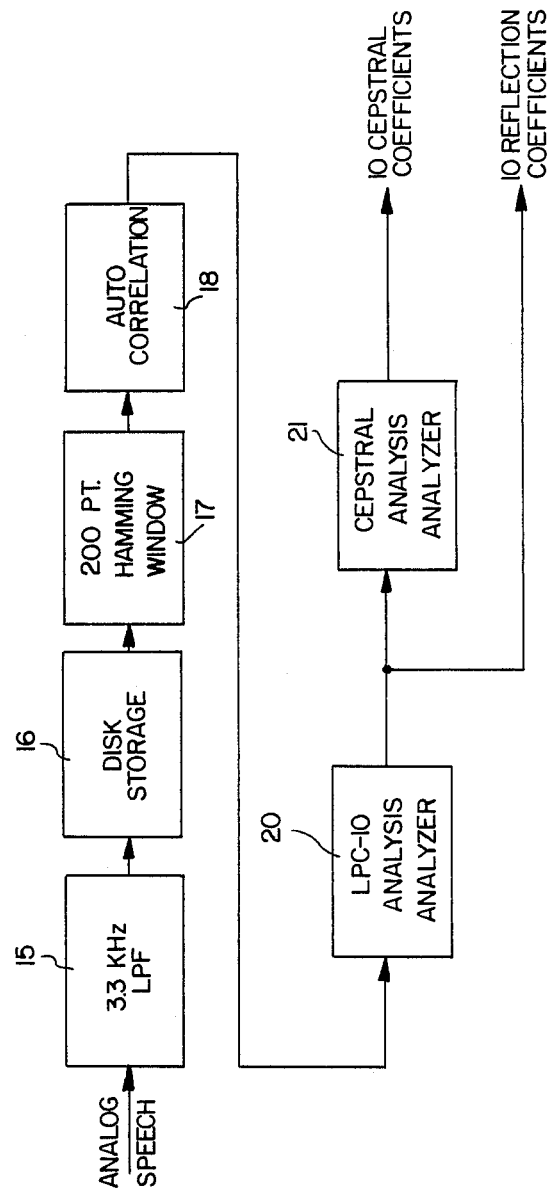
FIG. 2 is a simplified block diagram showing a front end processing circuit according to this invention.

Referring to FIG. 2, there is shown a more detailed block diagram of a typical front end processing unit which as one will ascertain will be defined in greater detail in the specification. Essentially, analog speech is applied to the input of a lowpass filter 15 having an upper frequency cutoff of 3.3 KHz. The analog speech which is lowpass filtered is then digitized at 8,000 samples per second each of which consists of 6 bits per sample. Analog-to-digital converters which can operate to do so are known in the art and operate to convert the analog speech into digital samples. Once digitized, the digital data is then stored on a disk storage 16 for use by either the speaker modeling unit 12 or the speaker recognition unit 14, as will be explained. For either model generation or recognition previously digitized speech samples are read from the disk 16 and processed to produce frames of speech parameters.

In order to do this, the speech samples from the disk are divided into predetermined frames with a new frame starting every 100 samples. Each frame consists of 200 samples and is subjected to a hamming window operation as evidenced by module 17. As one will ascertain, the hamming window approach is a well known technique which is utilized in speech recognition system in general and as can be evidenced from the above-noted references in the I.E.E.E. publication.

Essentially, the function of the hamming window is to take frames of speech and to provide smooth transitions. Since speech samples in a frame are indicative of a short interval, the Hamming window serves to multiply the speech data to achieve smooth rise and fall times. This is typically done by the use of a sine wave or other smooth transition waveform to enable one to obtain a smooth transition at the start and the end of a given length speech sample. The hamming window technique, as will be further explained, is utilized in conjunction with a fast Fourier transform technique (FFT) as well as utilized in conjunction with a linear predictive coding (LPC) algorithm all of which are well known to those skilled in the state of the art.

Thus a speech sample which is subjected to the hamming window process is then applied to an auto-correlation module 18.

Figure 3:
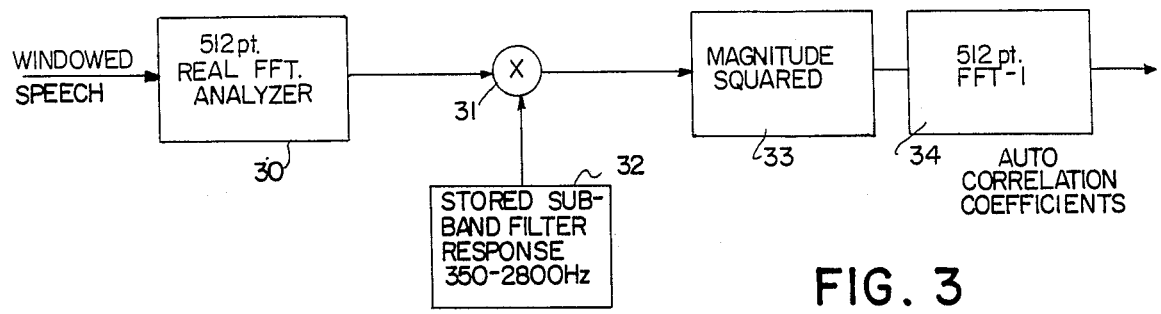
FIG. 3 is a block diagram depicting an auto-correlation module employed in FIG. 2.

Referring to FIG. 3, there is shown a more detailed function of the auto-correlation module 18. In any event, the output from the auto-correlation module operates to derive speech parameters for each input frame. Essentially, the output from the auto-correlation circuit 18 is directed to an LPC analyzer module 20. The function of the LPC analyzer is to preform a linear predictive code on the samples from the auto-correlation circuit. In this manner the LPC circuit 20 performs and operates according to a given algorithm which may utilize a 10th order LPC analysis. Thus the output from the LPC analyzer 20 produces 10 reflection coefficients at one output. The output of the LPC analyzer 20 is also directed to a cepstral analyzer 21 which essentially provides 10 cepstral coefficients which are derived from the reflection coefficients. These techniques are well known in the state of the art.

Referring to FIG. 3, there is shown a more detailed block diagram of the function of the auto-correlation circuit 18 of FIG. 2. As shown in FIG. 3, the windowed speech samples are applied to a 512 zero-filled fast Fourier transform (FFT analyzer 30 where the FFT for each frame is calculated. The resulting spectrum obtained from the analyzer 30 is multiplied in a multiplier 31 by the transfer function of a stored subband filter. This transfer function which is stored in module 32 is used to eliminate out-of-band components of the spectrum and as indicated in the Figure is represented between the frequencies of 350 to 2,800 Hz. The power spectrum obtained from the multiplier 31 is then derived from the complex spectrum. The magnitude of the spectrum is squared in a circuit 33 which operates to square the magnitude obtained from the output of multiplier 31 and then an inverse FFT is generated in module 34 to provide the autocorrelation coefficients. It is these coefficients which are sent to the LPC analyzer 20 to determine the reflection coefficients as well as the cepstral coefficients as explained.

As one can ascertain, the techniques of producing fast Fourier transforms in regard to windowed speech samples are also known as well as the technique for producing the inverse FFT. Essentially, the next step in regard to the processing technique is to derive speech parameters for each input speech frame. In order to accomplish this, one utilizes an algorithm. In this case a 10th order LPC analysis is implemented in module 20 whereby one obtains 10 reflection coefficients and 10 cepstral coefficients which are recursively derived from the reflection coefficients as seen in FIG. 2 and accomplished by module 21.

The auto-correlation coefficients are used to calculate LPC reflection coefficients by using one of many available algorithms. A particular useful algorithm is Levinson's recursive algorithm. This is a well-known algorithm in the speech processing art. Essentially, the 10 cepstral coefficients are derived recursively from the reflective coefficients, as will be shown mathematically.

The calculation starts with auto-correlation coefficients $\{r_l\}$ and proceeds in two steps. First the reflection coefficients $\{k_l\}$ and scaled filter coefficients $\{a_l\}$ are found using Levinson's recursion ◁. The energy of the prediction residual is also obtained in the first step. In the second step the cepstral coefficients $\{c_l\}$ are found using their recursive relation to the scale filter coefficients The mathematics are given below.

Step 1 - Reflection coefficients and scaled filter coefficients from auto-correlation coefficients.

A. Initialize $$k_1 = -\frac{r_1}{r_0}$$

$$a_{00} = a_{10} = 1$$

$$a_{11} = k_1$$

$$\sigma_1 = r_0(1 - k_1^2)$$

B. Levinson Recursion. Do for m=1 ... M−1

$$k_{m-1} = -\frac{1}{\sigma_m} \sum_{i=0}^{m} r_{m-1-i} a_{m,i}$$

$$a_{m-1,0} = 1$$

$$a_{m-1,i} = a_{m,i} - k_{m-1} a_{m,m-1-i} \quad 1 \leq i \leq m$$

$$a_{m-1,m+1} = k_{m-1}$$

$$\sigma_{m-1} = \sigma_m(1 - k_{m-1}^2)$$

Step 2. Cepstral coefficients from scaled filter coefficients

A. Initialize $$C_0 = \log(\sigma_m)$$

$$C_1 = -a_1$$

Do for $m_1 = 2 \ldots M$ $$C_m = -a_m - \frac{1}{m}[(m-1)C_{m-1}A_1 - (m-2)C_{m-2}a_2 - \ldots - C_1 a_{m-1}]$$

Figure 4:
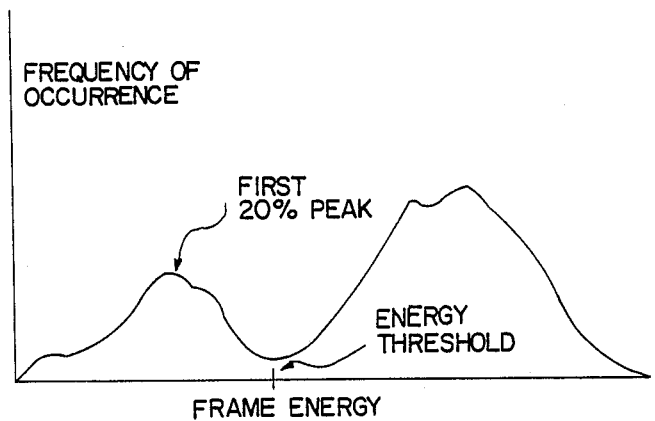
FIG. 4 is a diagram depicting the determination of a speech energy threshold from a smoothed frame energy histogram.

The final processing performed by the front end module is to determine if the current input frame contains speech. This is done using a simple adaptive energy thresholding technique. The speech energy threshold is estimated from a smooth histogram of the input frame energy. An ad hoc algorithm is used to determine this threshold. The first low energy peak in the histogram which is at least 20 percent as large as the largest histogram peak is assumed to contain the non-speech frames. The speech energy threshold is then set equal to the first minimum after the non-speech peak. This can be ascertained by referring to FIG. 4 whereby there is shown a graph of frame energy and the frequency of occurrence of energy to determine the speech energy threshold from the smooth frame energy histogram.

The 100 point frame energy histogram is continuously updated with each new input frame. Each bin in the histogram is passed through a lowpass filter that causes the values in the histogram to decay towards zero as a function of time. The lowpass filters for each histogram bin are implemented as single pole digital recursive filters with a time constant of approximately 2 seconds as defined below.

$$\text{Histbin } \{i\}_t = \left(1 - \frac{1}{T}\right) \text{Histbin } [i]_{t-k} + \frac{1}{T} {}^s Val$$

where:

Histbin$[i]_t$ is the $i_{th}$ histogram bin at time t, k is the 1/frame-rate = 0.01 seconds. T is the time constant of the filter = 2 seconds, and Val is: 1 if the current frame energy falls in Histbin$[i]$, 0 otherwise.

The histogram is then smoothed using a 3-point smoothing kernel.

SPEAKER MODELING IN MODULE 12

Speaker recognition models are generated by collecting statistics over the coefficients in the modeled data. The front end processor as processor 10 identifies where the frames of the data contain speech as described above. Coefficients from the speech frames (reflection and cepstral) are accumulated and the means and a covariance matrix are calculated. These statistics are used in the MAHALANOBIS distance computation during recognition.

Thus, as one can ascertain, models are generated in the speaker modeling module 12 of FIG. 1. The speaker recognition module which is 14 of FIG. 1 implements recognition of speakers. The recognition module 14 makes use of both speech and non-speech frames. The speech frames are used to characterize the talker for recognition and the non-speech frames are used to detect possible changes in talkers. Recognition is performed by comparing the common average parameter vector as derived from the coefficients with each of the active speaker models as stored. Once per second the identity of the three models that are closest to the speech being recognized are output with their corresponding scores. The current average parameter vector is the average over the last N seconds of speech. Each second the frames from the last second are accumulated and added to the average. At the same time, frames for the Nth second in the past are eliminated from the average.

The distance is then computed using the Mahalanobis metric:

$$D_i = (X - M_i)^T C_i^{-1} (X - M_i)$$

where
 D is the Maholonobis distance
 X is the input parameter vector
 $M_i$ is the parameter vector from the $i^{th}$ model, and
 $C_i$ is the covariance matrix for the $i^{th}$ model.

The recognition module also monitors non-speech frames to detect pauses in the input speech that are associated with possible changes in talkers. When non-speech frames are input, the recognition module ignores the frame but increments the silence-frame-in-a-row counter. This counter is cleared anytime a speech frame is input. If the silence-frames-in-a-row counter exceeds a silence threshold (user selectable default value of 0.5 seconds), the recognition module signals a possible change in talker. The data in the current average parameter vector is then zeroed so that any further recognitions will be based only on data received after the silence gap.

The distances are converted to speaker confidences using the following equation.

$$\text{Conf} = \frac{\alpha - \beta}{\gamma} = \delta$$

where
 a = 7.0 (Emperically determined)
 $\beta$ = Min. ($\theta$.a)
 $\theta$ = Max. (d.0.0)
 d = Mahalanobis distance
 $\delta$ = Min. (f .mf) mf
 f = frames used in recognition
 mf = 150 (Emperically determined)
For the system a low confidence was defined to be a confidence value less than 0.7.

Again, briefly summarizing the above and referring again to FIG. 1, it is seen that the front end processing circuit 10 which essentially, as will be explained, may include a digital computer operates to digitize and buffer the input analog speech wherein in the front end the speech is lowpass filtered at 3.3 Kz via the lowpass filter 15 of FIG. 2. It is sampled at 8,000 samples per second and is converted into 16 bit samples by means of a linear analog-to-digital converter. The suitable parameters are extracted by utilizing a 200 point Hamming window which is overlapped by 50 percent. The output of the Hamming window analyzer is directed to an auto-correlation circuit whereby a 512 point fast Fourier transform is provided. The transform output is multiplied by an input spectrum utilizing the subband filter spectrum.

This is squared in order to calculate a power spectrum and then an inverse FFT is formed. From the inverse FFT which emanates from the auto-correlation circuit 18, one now derives the reflection coefficients by using a linear predictive code. This is implemented by means of the Levinson recursion algorithm. From these reflection coefficients, the cepstral coefficients, as for example 1 to 10, are recursively derived. Speech frame detection occurs if the frame energy is greater than the current speech energy threshold then that frame is marked as a speech frame. As will be explained, the current speech energy threshold is updated. This is accomplished by updating the frame energy histogram and one then estimates the current speech energy threshold from the histogram. The histogram is that as shown for example in FIG. 4. In regard to speaker modeling all non-speech frames are ignored then the average speech frame parameters are used until the end of the model data file. Once there is an end to the model data file, one calculates the covariance matrix which is then inverted and one then stores the average parameters and the inverse matrix as modeled in memory.

In order to achieve recognition of speakers, the following occurs. For all non-speech frames obtained from the front end processing, one increments the number of non-speech frames which occur in a row. If the number of non-speech frames in a row is greater than the silent threshold, one then clears all one second parameter accumulators. For all speech frames obtained from the front end processor, one sets the number of non-speech frames in a row to zero. One then increments the speech frame counter. If the speech frame counter is greater than the number of frames in one second, the current one second parameter which is in the accumulator is saved and one then initializes a new current one second parameter accumulator. One then operates to average the past N one second parameter accumulator. The Mahalanobis distance between the average parameters, and each of the active speaker models is then calculated.

The system then operates to output the lowest three distances and the corresponding speaker numbers while adding the current frame to the current parameter accumulator. In this manner one can recognize each speaker by means of the measured distances and furthermore one can do this without regard to any speaker being required to utter a predetermined pattern. Thus, as will be explained, this technique scales frame parameters as a function of the frame power. Hence in this technique all available speech frames are accumulated but those frames having low power are deemphasized as not being speech frames.

The complete hardware implementation of the system will be described in greater detail.

Figure 5:
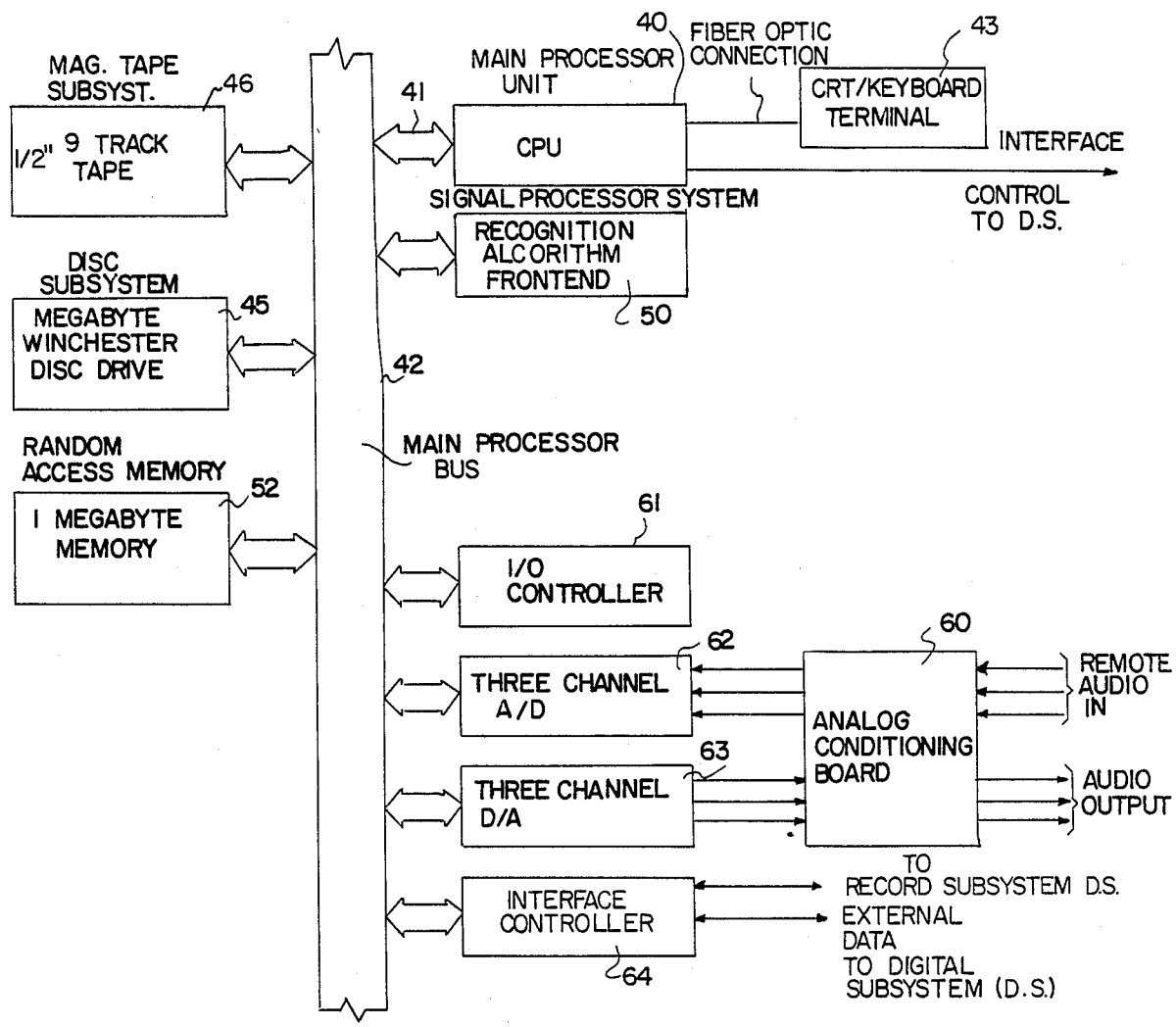
FIG. 5 is a detailed block diagram showing the speaker authentication system according to this invention.

Referring to FIG. 5, there is shown a complete block diagram of a speaker authentication system according to this invention. As one can see from FIG. 5, there is a main processor unit 40 designated as a CPU. The main processor unit 40 has a bidirectional bus 41 connected to a main processor bus 42 which essentially enables the main processor unit to control all modules that are connected to the main processor bus 42 as well as to enable the various modules to communicate with the CPU as will be further explained. The individual moules as well as the CPU 40 are coupled to the bus via a multibus interface logic module which modules are supplied by many companies.

The CPU or main processor unit coordinates the activities of the major subsystems and serves to provide the proper interface between the operator and the authentication system. The CPU 40 contains the operating system software and enables interaction with an operator. As can be seen from FIG. 5, the CPU is connected via a typical fiber optic link or communications link to a CRT keyboard terminal 43 which for example may be an operator's terminal.

Essentially, as will be described and as indicated above, the main function of the CPU 40 is to schedule all processes required to implement the various recognition algorithms as discussed. The CPU also serves to provide access to mass storage elements that are required to store digitized speech as well as speaker models and recognition results. As indicated, the operator interacts with the system through the CRT and keyboard terminal 43 which is coupled to the CPU. This terminal may be part of an operator's console associated with the system which requires speaker identification.

Also shown coupled to the main processor bus 42 is a disk drive or disk subsystem 45. The disk is a memory which is available from many suppliers and operates to store system software as well as digitized speech and speaker models. The disk system 45 is a relatively rapid system to enable and accommodate high speed data transfer rates which are associated with real time digitizing and playing of speech. The disk subsystem 45 is used to store all the digital speech necessary to produce the above-described speaker models.

Hence the entire operating system for the speaker recognition system is stored on the disk subsystem 45. This can include all the necessary compilers, assemblers and so on necessary to generate the proper operation of software for each of the subsystems included in the main system. The disk memory 45 also stores the system source code which is employed throughout the system. Also shown coupled to the main processor bus 42 via a bidirectional bus is a tape subsystem 46. The system 46 is a conventional magnetic tape system and is employed to provide backup for the critical information stored on the system disk. This provides protection against loss of speech data and software due to hardware failure or operator error. It also provides storage of speech or model data which is not needed in the system on a daily basis.

Also shown coupled to the main processor bus 42 is a recognition algorithm front end system or a signal processor subsystem 50. Essentially, the recognition algorithm front end system 50 is a dedicated processor which functions to execute a large portion of the speaker recognition algorithms. The major computational tasks as converting the input speech wave into the LPC coefficient or parameter representation of the speech and comparing the speech input parameters with the stored speaker models is accomplished in the recognition algorithm front end module 50.

Also shown coupled to the main processor bus 42 is a random access memory 52. The random access memory 52 may for example be a 1 megabyte memory and is utilized for peripheral storage of data and also operates in conjunction with the disk memory 45 and the magnetic tape system 46.

As seen in FIG. 5, there is shown an analog conditioning board 60. The analog board 60 as indicated receives audio at its various inputs or speech to be processed and can direct output audio or process speech from the output terminals. Hence as seen, there is a remote audio IN which consists of a series of terminals and an audio output section which also consists of a plurality of terminals. The analog conditioning board 60 interfaces with three-channel analog-to-digital converters 62 and also interfaces with three-channel digital-to-analog converters 63. Both the analog-to-digital converter 62 and the digital-to-analog converters 63 are coupled to the main processor bus via bidirectional buses as shown in the diagram. Further coupled or connected to the main processor bus is an input/output (I/O) controller 61 and an interface controller 64. The main function of the analog conditioning board 60 in conjunction with the analog-to-digital converters 62 and the digital-to-analog converters 63 is to perform analog-to-digital and digital-to-analog conversion. The board may also contain appropriate filters, amplifiers and automatic gain control circuitry in order to assure that the signal levels for the system are proper.

The function of the input/output controller or I/O controller 61 is to interface with the digital data from the analog-to-digital converters 62 and to enable the transfer of digital data to the digital-to-analog converters 63. The I/O controller 61 assures the rapid movement of large amounts of data. As can be seen, the main processor unit or CPU 40 accomplishes data movement via the main processor bus 42. In any event, based on the huge amount of data to be moved, a substantial portion of the CPU 40 time would be diverted making it unavailable to respond to operator requests in a timely manner.

Hence the I/O controller 61 is provided to allow all data transfers to the digital to analog converters 63 to occur while further coordinating the movement of data from the analog-to-digital converters 62 to the signal processing subsystems. The I/O controller 61 typically includes necessary data buffers which are required to store digitized speech prior to recognition and serves to control the transfer of speech to the operator via the digital-to-analog converters 63. The I/O processor 61 also interacts with the disk subsystem 45 via the main processor bus 42 enabling it to transfer data to and from the analog-to-digital and digital-to-analog converters as 62 and 63.

As indicated above, an interface controller 64 is also bidirectionally coupled to the main processor bus 42. Speech to be transferred includes new model material to be stored on the disk's system 45 for later use by the system to generate or update speaker models and speech to be identified is also stored on this disk subsystem. The interface controller 64 provides high speed digital data paths between the disk system and the recorder systems to enable the high speed requirements to be implemented.

As one can ascertain from the block diagram of FIG. 5 and a relatively simple explanation given thereof, all of the components as depicted in FIG. 5 are the subject of conventional commercially available components and descriptions of suitable types of components will be given subsequently in this specification. As one can ascertain from FIG. 5, the majority of all interactions between the CPU 40 is coordinated by the same through the main processor bus 41 which enables the CPU 40 to interface with the various system modules. The CPU 40 controls software, writes commands into registers in the desired subsystems and in addition reads status registers to monitor the status and progress of the subsystems. The major functions which are implemented by the system include (1) digitizing and storing data on the disk 45, (2) storing of speech data on the disk 45, (3) playing back digitized speech from the disk 45, (4) recognizing speakers from live speech, (5) recognizing speakers from stored digital data, (6) generating models.

In order to explain each of the above-noted processes and to further determine how they are implemented, a series of flow diagrams will be given showing the implementation of the above-described operations. Number in parenthesis indicate the logic module employed in the description.

Figure 6:
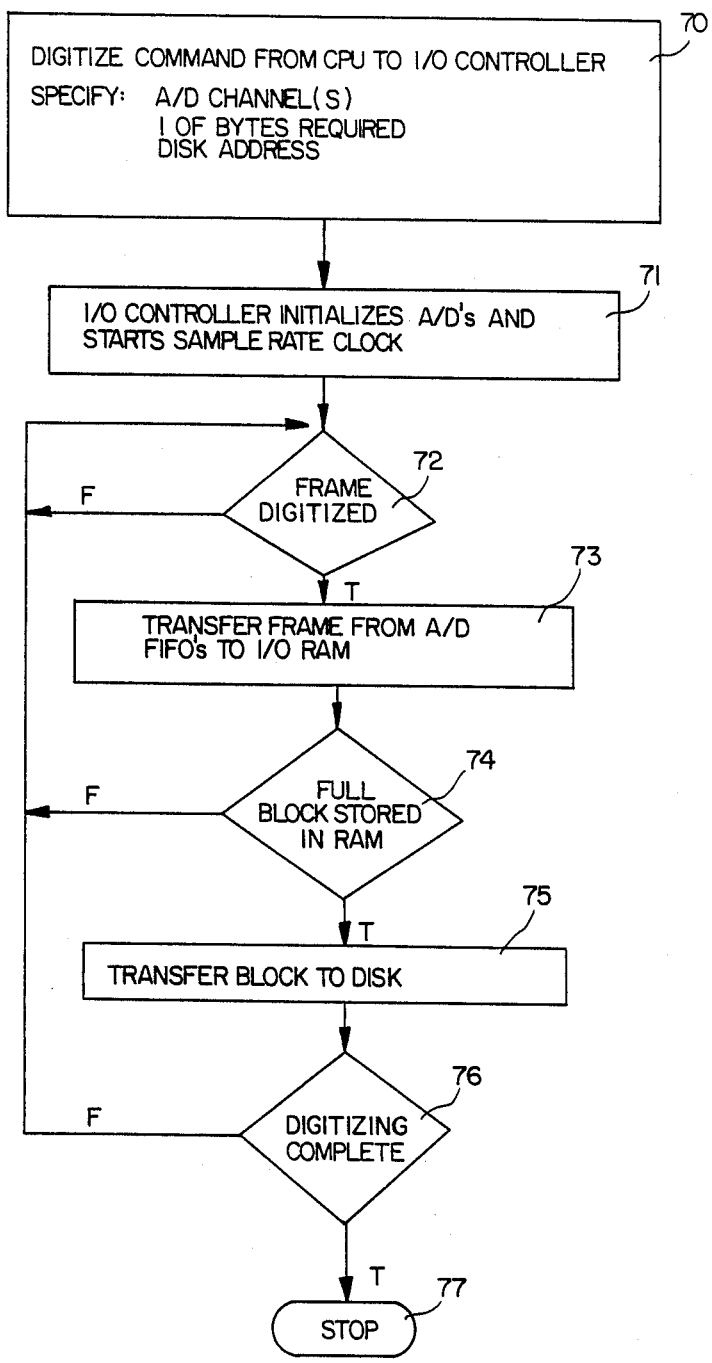
FIG. 6 is a block diagram in flow form depicting the storing of digitized speech on a disk.

Referring to FIG. 6, there is shown a flow diagram depicting the process of storing digitized speech on the disk subsystem 45. Essentially, as will be ascertained and again referring to FIG. 5, storing digitized speech data on the disk 45 involves the control of the disk subsystem 45, the I/O control processor 61 and the A/D converter system 62. The direct control of the A/D converters 62 is provided by the I/O control processor 61.

FIG. 6 is again a block diagram in flow chart form showing the digitizing process. As indicated by module 70, the CPU 40 sends a digitized command to the I/O controller 61. Essentially, the control software of the CPU writes commands to the mail box registers in the I/O control processor 61 instructing it to begin digitizing a particular channel of A/D data and to store the data on the system disk 45 in specified blocks. As shown by module 70, in order to accomplish this, the CPU has to specify the particular A/D channel, specify the number of bytes required and also specify the disk address. The terminology utilized module 70 is sufficient for one skilled in the art.

After receiving the command from the CPU, the I/O control processor 61 interprets the commands, sets a busy flag in a selected male box register contained in the I/O processor and begins processing the command. The operation of an I/O processor as processor 61 is also well known in the art. The I/O control processor 61 accesses the control and status register of the A/D converter board to clear the input registers which for example are first-in, first-out registers (FIFO) of any old data. This process is briefly shown and described in FIG. 7.

Figure 7:
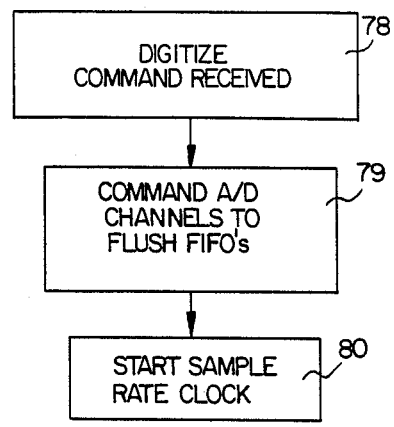
FIG. 7 is a block diagram in flow chart form depicting initialization of an analog-to-digital converter by a I/O controller.

Thus, referring to FIG. 7, there is shown the initialization of the A/D board by the I/O controller. The I/O controller sends the A/D board a digitized command 78 which is acknowledged received by the board and commands the A/D channels to flush or reset the registers 79 which are normally first-in, first-out or FIFO devices. After implementing this instruction, the A/D converters start to sample data via the sample rate clock as evidenced by module 80 of FIG. 7. The sample rate clock on the I/O control processor board, as indicated, is started and an on-board counter is used to count the number of sample clock pulses which are issued. This procedure is briefly shown in FIG. 8.

Figure 8:
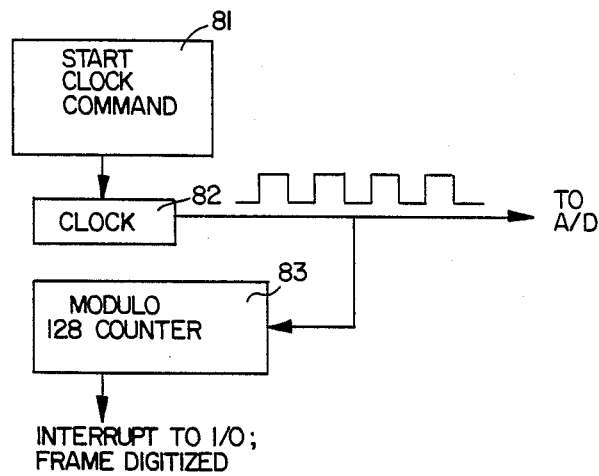
FIG. 8 is a block diagram showing the initialization of an analog-to-digital converter clock by the I/O controller.

As seen in FIG. 8, the I/O processor 61 starts its clock via the command as evidenced by module 81. This start control signal is directed to a clock 82 which commences to produce output sampling pulses which pulses ar supplied to the analog-to-digital converter board as the A/D 62. The output pulses are monitored by a modulo 128 counter 83 which again is a conventional component. The counter 83 provides an interrupt to the I/O processor each time a frame is digitized. As indicated above, a frame consists of 200 samples after having been Hamming windowed. Essentially, the speech sample from the disks are divided into frames where a new frame starts every 128 samples.

Hence for each sample clock pulse received, the A/D board or module 62 digitizes and stores one speech sample on its on-board FIFO. The on-board FIFO may for example be 132 by 16 bits.

Figure 9:
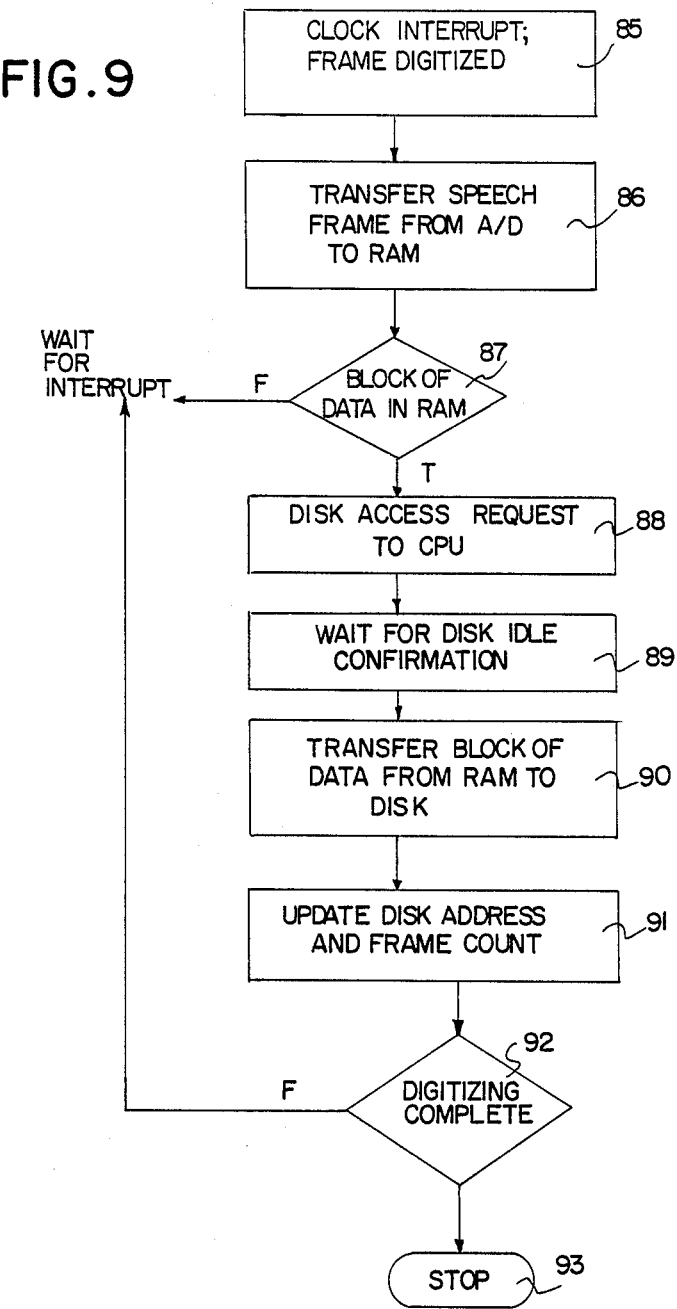
FIG. 9 is a flow chart showing the transfer of analog-to-digital data to a disk by the I/O controller.

Referring to FIG. 9, there is shown the transfer of the A/D data to the disk 45 by operation of the I/O controller 61. In the following description reference is made to FIG. 9 in order to completely understand the system operation. Essentially, as one will ascertain, each time one frame which is 128 samples of data has been digitized an interrupt is issued to the I/O control processor which then reads all 128 samples from the A/D FIFO and stores those samples in the on-board RAM (86, 87) which for example may consist of 256 K bytes. The time required to read 128 samples is approximately 360 microseconds or 2.8 percent of real time. As indicated and shown in FIG. 5, if three A/D converters are active, 8.4 percent of real time is required to transfer the data from the FIFO to the on-board memory. The I/O controller 61 continues to transfer frames of data from the A/D FIFO into its local memory until a complete block of data (typically 8K bytes) has been buffered. When a block of data is ready to be saved, the I/O controller writes a disk controller request command into one of its local male box registers and issues an interrupt to the CPU processor.

By referring to FIG. 9, this is shown by means of module 87. Hence in FIG. 9 module 85 interrupts the clock interrupt signal when the frame is digitized. After digitizing a frame, the speech is transferred from the analog-to-digital converter to the on-board RAM as evidenced in module 86. Once the block of data is in the RAM an interrupt is issued to the CPU (87). The CPU recognizes the interrupt and completes any disk transfer already in progress and notifies the I/O control processor via a mail box register that the disk controller is idle. This is evidenced by blocks 88 and 89 of FIG. 9. The I/O processor then issues a write command to the disk controller to transfer th block of data in its local memory to the next disk blocks in the list which is provided by the CPU as indicated by module 90 of FIG. 9.

The above-noted steps are repeated until either the number of data bytes requested by the CPU has been stored or until the CPU issues a stop command. When the digitizing is completed (92), the I/O processor sets a done flag in a mail box register and the I/O processor becomes idle until a new command is received from the CPU (93). This is indicated by module 92 and 93 of FIG. 9.

Figure 10:
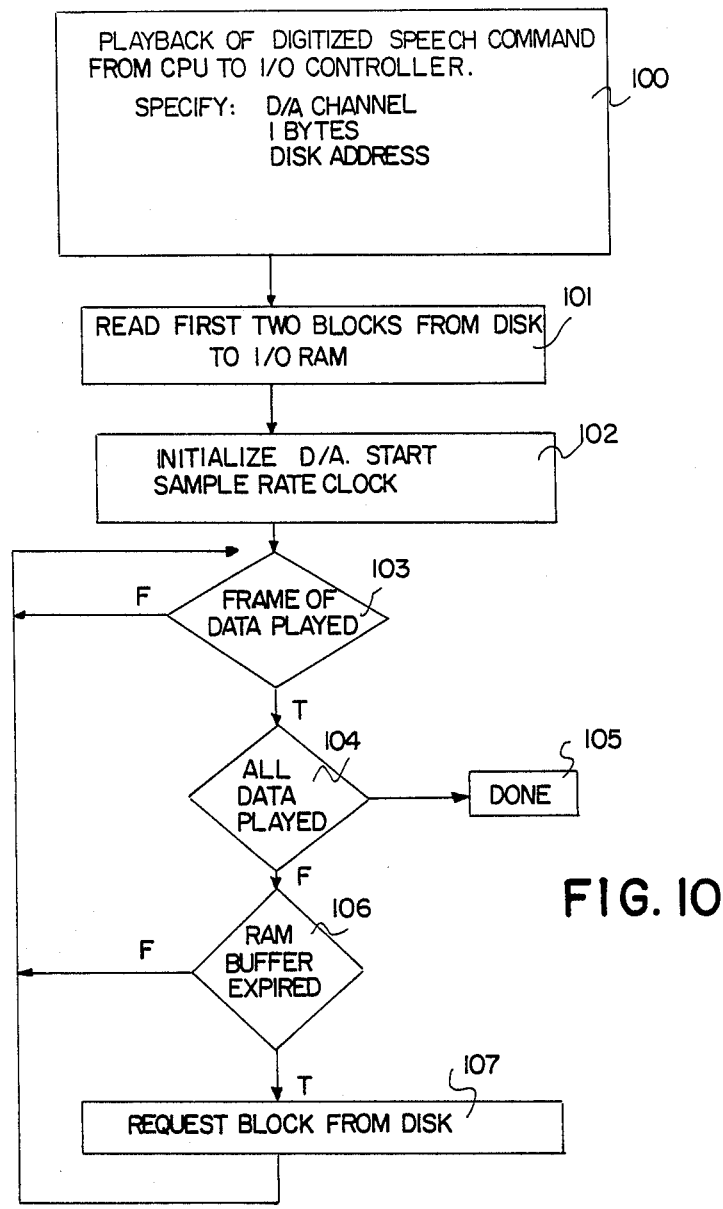
FIG. 10 is a flow chart depicting the playback of digitized speech/from a disk.

Referring to FIG. 10, there is shown a block diagram again in flow chart form indicating the playback of digitized speech from the disk subsystem 45. Essentially, the playback of digitized speech from the disk 45 is the reverse of the digitizing procedure as defined. The playback procedure is as follows. As indicated in module 100, the CPU controlled software issues the command to the I/O processor via mail box registers to read the specified blocks from the disk system 45 and play them out via one of the three D/A converters as converters 63 of FIG. 5.

Figure 11:
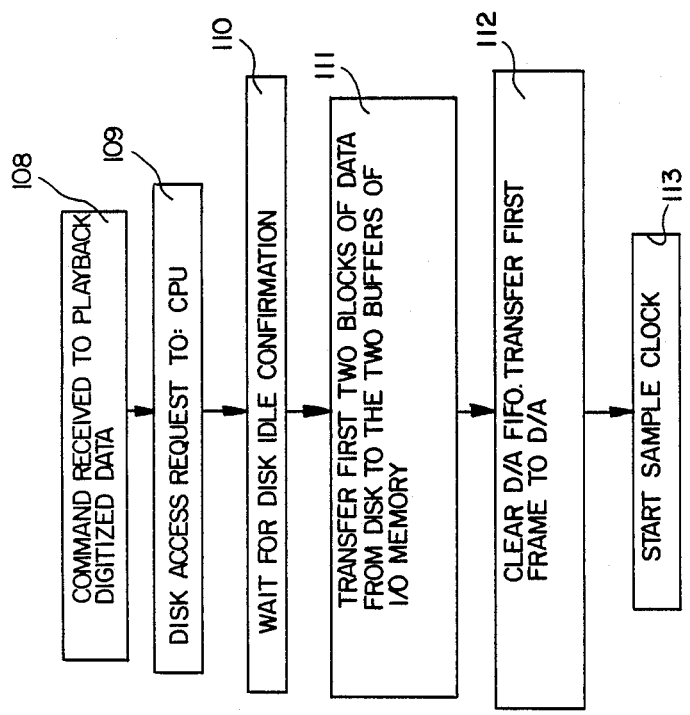
FIG. 11 is a flow chart depicting the initialization of a digital-to-analog converter by the I/O controller.

FIG. 11 depicts the initialization of the digital-to-analog converters by I/O controller 61. Reference will be made to FIGS. 10 and 11 in regard to the following description. The I/O processor 61 writes a disk controller request command (108, 109) into a mail box register and issues an interrupt to the CPU processor 40. The CPU 40 acknowledges the interrupt and notifies the I/O processor when the disk controller is available. This is shown in FIG. 11 by modules 108, 109 and 110. The I/O processor then issues commands to the disk to read the first and second data blocks and write them into the I/O controller on-board memory as indicated by module 111 of FIG. 11. It is noted that the I/O controller uses double buffering so that while one data buffer, typically an 8K byte buffer, is being played out a second buffer is being filled to be used next. This is a conventional approach. Once the first blocks of data are in memory, the I/O controller accesses the D/A boards command and status register to clear the D/A registers which again are FIFO's.

The first 132 samples of speech are then transferred by the I/O controller into the FIFO's of the same. The I/O controller's on-board sample clock is then started to provide the output sample clock to the D/A converter. A second on-board counter is used to provide an interrupt every 128 samples so that the I/O controller can reload the D/A FIFO's. (FIGS. 10, 100, 101, 102).

Figure 12:
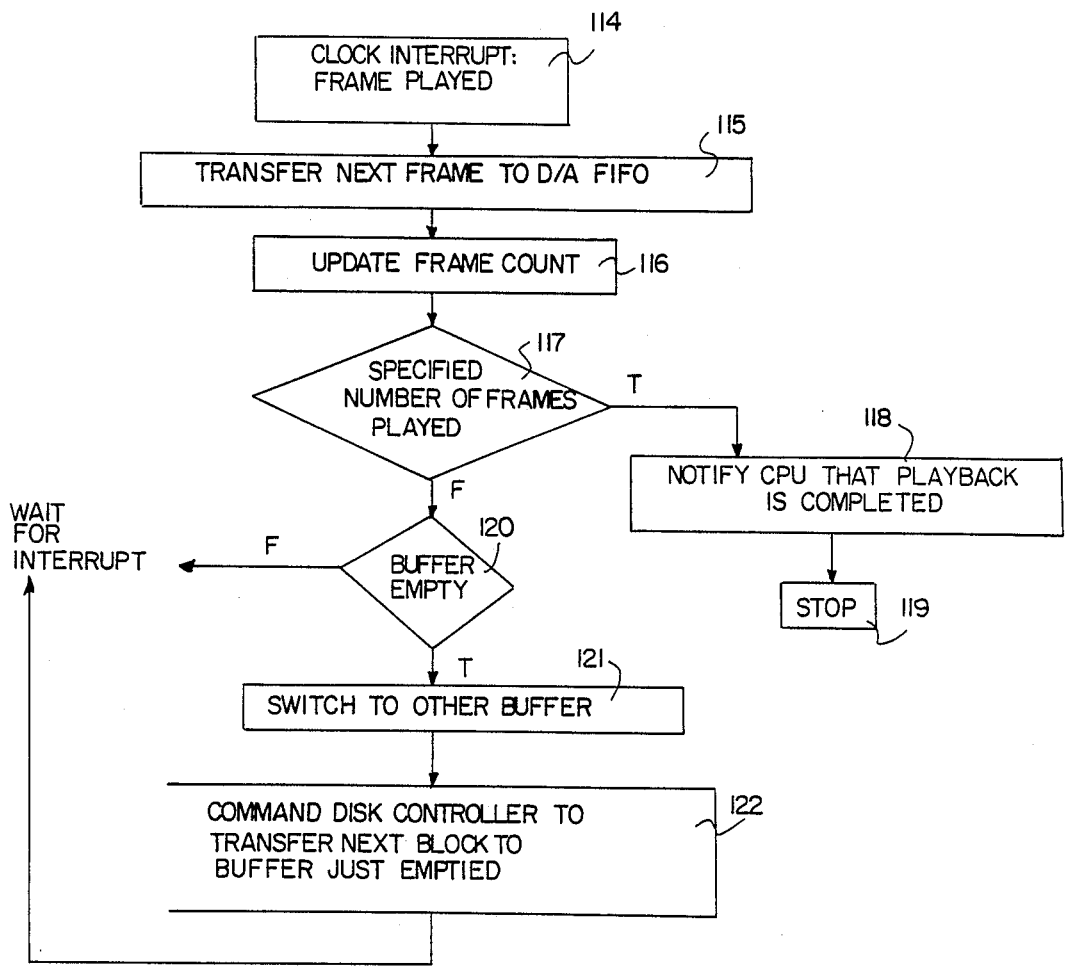
FIG. 12 a flow chart depicting the transfer of disk data to the digital-to-analog converters by the I/O controller.

During the next part of this description, reference is also made to FIG. 12 which shows the transfer of disk data to the digital-to-analog converters by the I/O controller. The I/O processors interrupt each time 128 data samples have been used and the D/A FIFO is reloaded from the data buffers in the I/O processor's memory. When an entire buffer typically 8K bytes has been exhausted, the I/O controller requests a new buffer from the disk. The above last steps are repeated until either the number of data bytes requested by the CPU have been played or a stop D/A command is issued by the CPU. This is indicated in FIG. 12 by modules 117, 118 and 120. Essentially, as one can see from FIG. 12 and as will be further apparent, during a clock interrupt, a frame is played and the frame played from the disk as evidenced by module 114 is transferred to the digital-to-analog register as evidenced in step 115.

The frame count is updated as shown in 116 until a specified number of frames is played. If a specified number of frames is played then this indication is sent to the CPU that playback is completed as evidenced by modules 118 and the process is stopped. If in any event, the specified number of frames is not played then the buffer will not be emptied. If the buffer is not empty, one switches to another buffer and commands the disk controller to transfer the next block of data to the buffer which was just empty as shown in 122. The process continues until the requisite number of frames are played back as evidenced and shown in FIG. 12. The next function that the system must perform is the recognition of speakers from live speech.

To recognize speakers from a speech analog input, there are several processes which must be run simultaneously as listed below.

Figure 13:
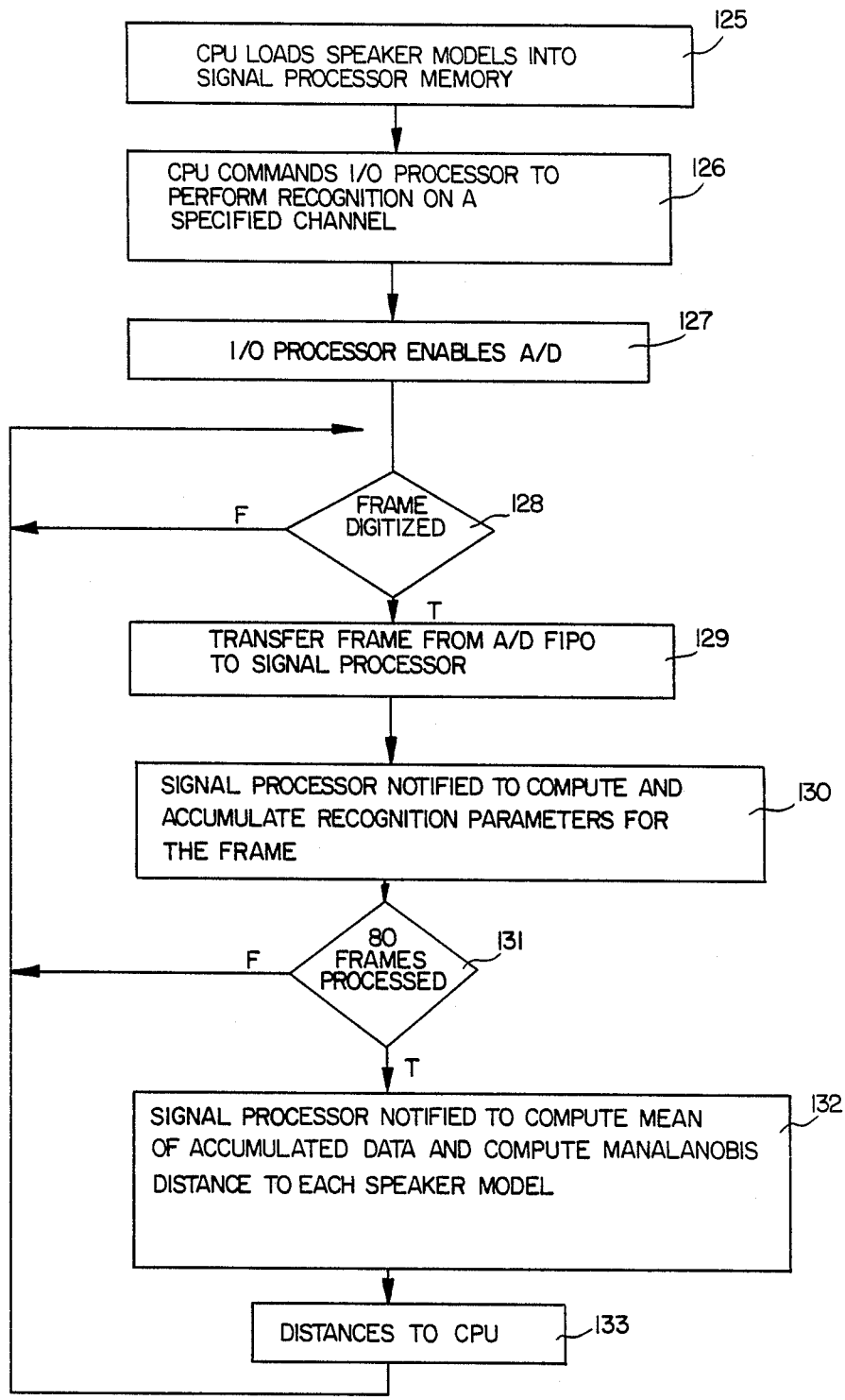
FIG. 13 is a flow chart depicting the processes required for recognition from live speech.
Figure 13:
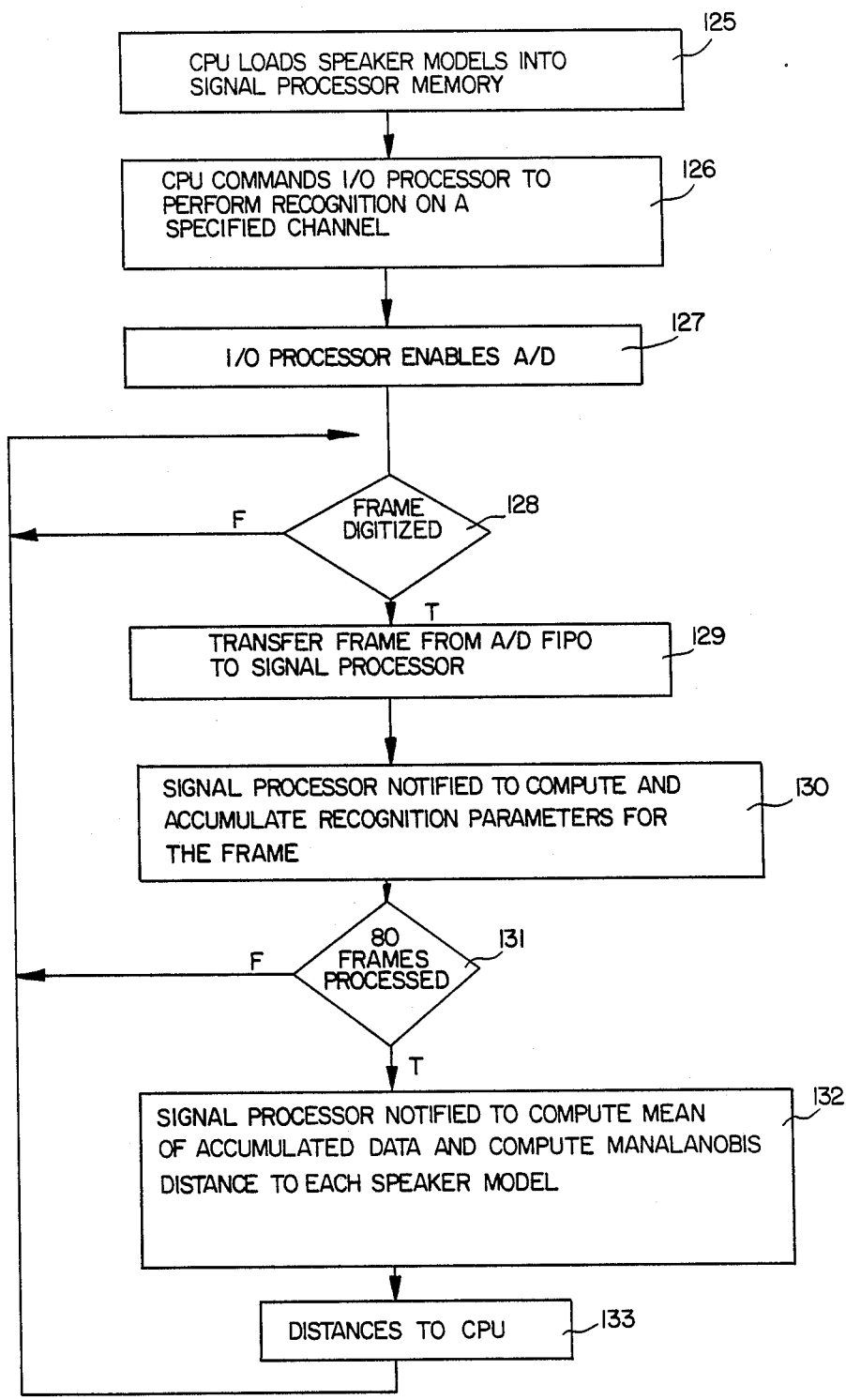

FIG. 13 gives a detailed flow chart of the processes required for speaker recognition from live speech. In any event, the processes that must run are as follows. (1) analog speech must be digitized and buffered, (2) the digitized speech must be processed to provide recognition parameters once every 125 millisecond frame time, (3) the recognition parameters for each frame must be accumulated to be used for recognition, (4) the distance between the current accumulator parameters in each of the active speaker models must be computed every second to provide recognition scores.

Thus in regard to such processes and particularly referring to FIG. 13, the CPU implements the live recognition processing based on its control software. The CPU processor 40 first loads the desired models into the signal processors subsystem's memory. This is the module 50 of FIG. 5 which is also a microprocessor or an array processor containing a memory. The CPU then commands the I/O processor to perform recognition on a specified channel (126). The majority of the recognition processing is controlled by the I/O processor 61 thus leaving the CPU processor available to interact with the user or for log recognition results and start the playback of selected talkers.

Figure 14:
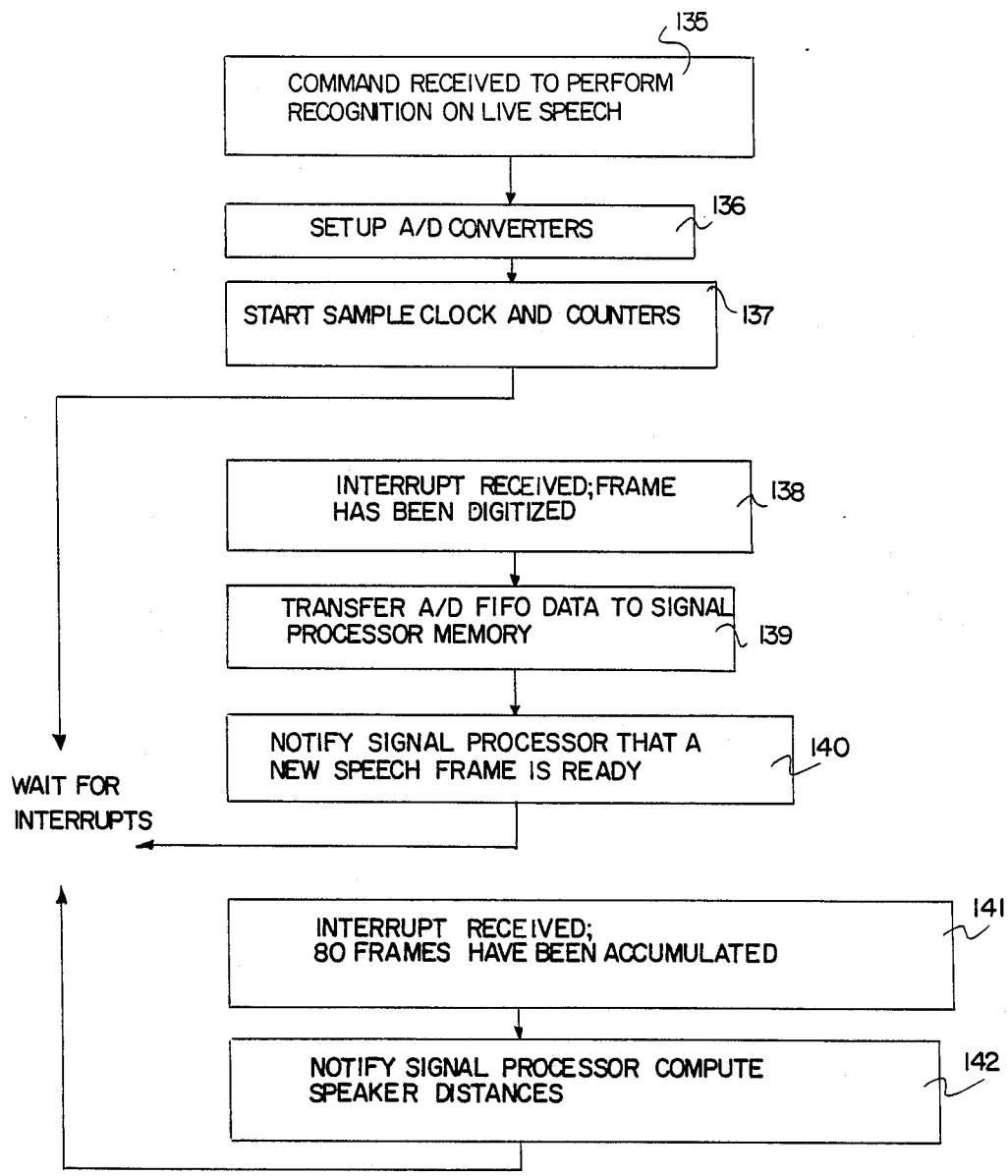
FIG. 14 is a flow chart depicting the I/O processor control for speaker recognition.

Speech recognition processes to control the I/O processor or controller 61 are shown in FIG. 14, which depicts the I/O processor control of speaker recognition. A command is issued by the CPU to the processor to enable it to perform live recognition on a specified channel which is evidenced by module 135. The I/O processor or controller 61 via the bus 42 sets up the A/D converters as shown in 136 and allows them to begin acquiring digitized data. Once the A/D converters are started, the only processing required of the I/O controller 61 by the A/D converters is to respond to interrupts once every 128 samples which is one frame time. The interrupt routine transfers the data in the A/D FIFO into the signal processing subsystem's data memory (138, 139) for processing and issues commands to the signal processor to compute and accumulate recognition parameters for the new frame (140).

Approximately 650 microseconds are required for the transfer which must be performed every frame (12.5 milliseconds). After each 80 frames of input speech is processed, the I/O control processor 61 will issue a command to the signal processing subsystem to calculate distances and according to the above-described algorithms. The signal processor will then calculate the distance between each of the models currently loaded in the processor and the accumulated speech parameter vector.

Figure 15:
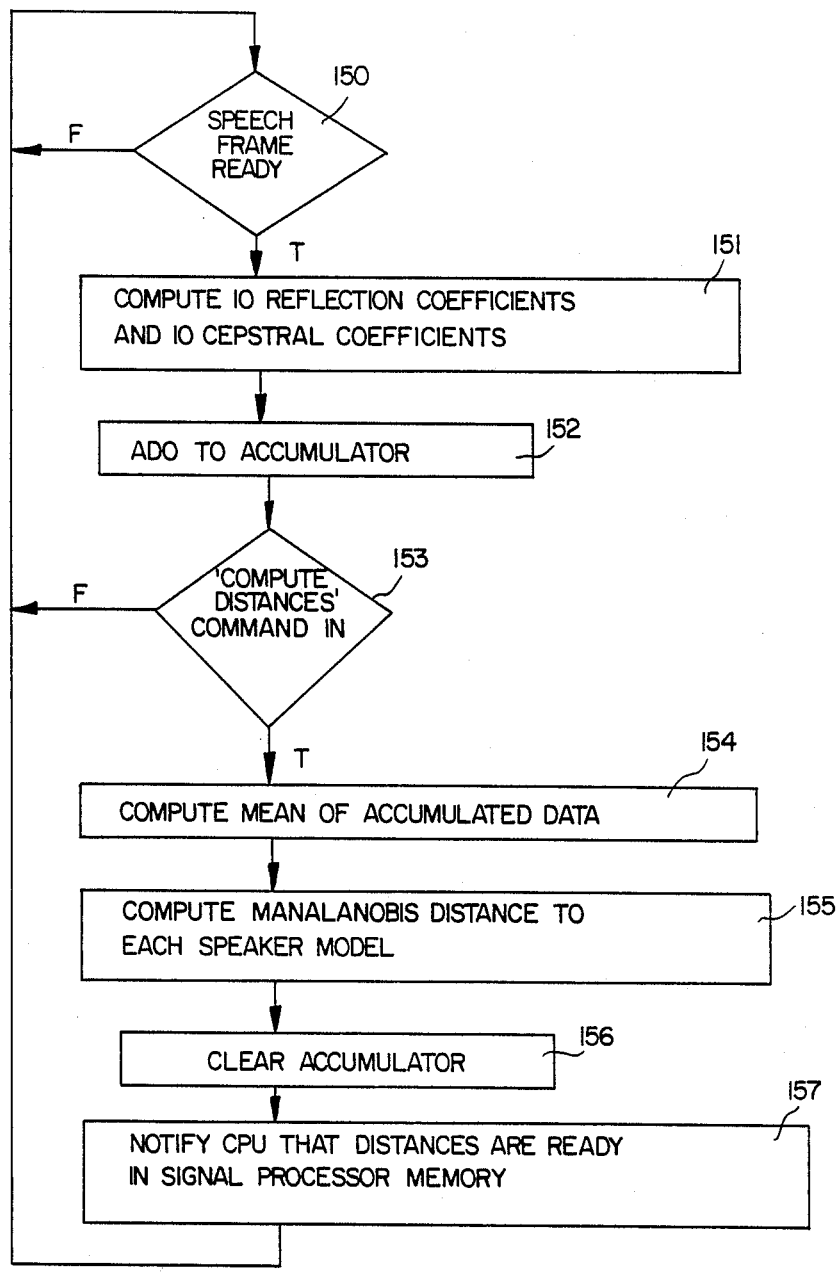
FIG. 15 is a flow chart depicting signal processor operation during speaker recognition.

This is shown by modules 141 and 142 of FIG. 14. The computationally intensive portions of the recognition algorithm are done in the signal processing subsystem as for example system 50 depicted in FIG. 5. This particular operation is more clearly shown in FIG. 15. Hence as shown in FIG. 15 by module 150, once every frame, the signal processor is loaded with new speech data by the I/O controller 61 which also issues to it a command to process a frame. The signal processor 50 then computes and accumulates the speaker recognition parameters by performing in sequence the following operations. The new 128 speech samples are concatinated with the previous 128 samples and windowed with a 256 point hamming window. The power spectrum is determined by calculating the squared magnitude of the complex spectrum in each frequency bin as described above in conjunction with FIGS. 1–4. The subband filter is applied by performing a point-wise multiplication of the filter function and the magnitude spectrum. The 10 point auto-correlation vector for the current frame is then calculated by performing 10 dot products between the power spectrum and the first 10 cosine basis vectors of the inverse Fourier transform (FFT).

The 10 LPC filter and reflection coefficients are calculated using Levinson's recursion algorithm or some other suitable algorithm and based on the auto-correlation coefficients. This is essentially indicated by module 151 of FIG. 15. The 10 cepstral coefficients are determined recursively from the 10 LPC filter coefficients as described above. Then the 10 cepstral and the 10 reflection coefficients are accumulated for latter use in the calculation of distances between unknown N models; the process indicated above is repeated indefinitely during speech recognition.

As shown in FIG. 15, the reflection coefficients once determined as evidenced by module 151 are added in the accumulator whereby the output of the accumulator is utilized to compute distances based on the command indicated by module 153. In module 154 there is computed the mean of accumulated data from which the distance to each speaker model is computed as evidenced is module 155. Once this is done, the accumulator is cleared and the CPU is notified that the distances are ready in the signal processor memory (156, 157).

Once every second the system provides an output of the current speakers most probable identity. As indicated above, this is done by calculating the MAHALANOBIS distance between the current accumulated speech parameter vector and each of the active models. This processing is performed in the signal processing subsystem 50 of FIG. 5. The receipt of the command to calculate distances is issued by the I/O processor or controller 61 after each 8 frames.

The similarity scores for each of the models are stored in the signal processor shared memory where they are read by the CPU controlled software. As soon as the unknown to model distances are calculated, the I/O processor resumes providing speech frame data to the signal processor and the process continues. The CPU controlled software is responsible during live recognition for reading and storing the unknown to model distances calculated 1 per second by the signal processor subsystem.

The logic for deciding whether to play or mute a specified speech passage is implemented in the CPU. The distances are analyzed each second and commands are sent to the I/O processor indicating which if any speech data should be played to the operator via the D/A module 63. It is important to note that the I/O processor has enough on-board memory to buffer up to 5 seconds of speech for each of the three input channels. Therefore, no speech data needs to be written or read from the disk during speech recognition. Speech data played for the operator when a speaker recognition is made comes directly from the buffer memory on the I/O processor 61.

It is also understood that one can also recognize speakers from stored digital data from a digital subsystem D.S. as shown in FIG. 5. To accomplish this or to perform recognition on data previously digitized and stored, digital speech must be obtained via the interface channel and from any recorder subsystem containing stored speech such as from the digital subsystem D.S. The data is stored or buffered in the I/O control processor 61 in exactly the same way as the samples from the A/D converters 62 are buffered in the live recognition mode.

Once the data from the storage is buffered, the recognition processing proceeds exactly as described for live recognition as indicated above.

Figure 16:
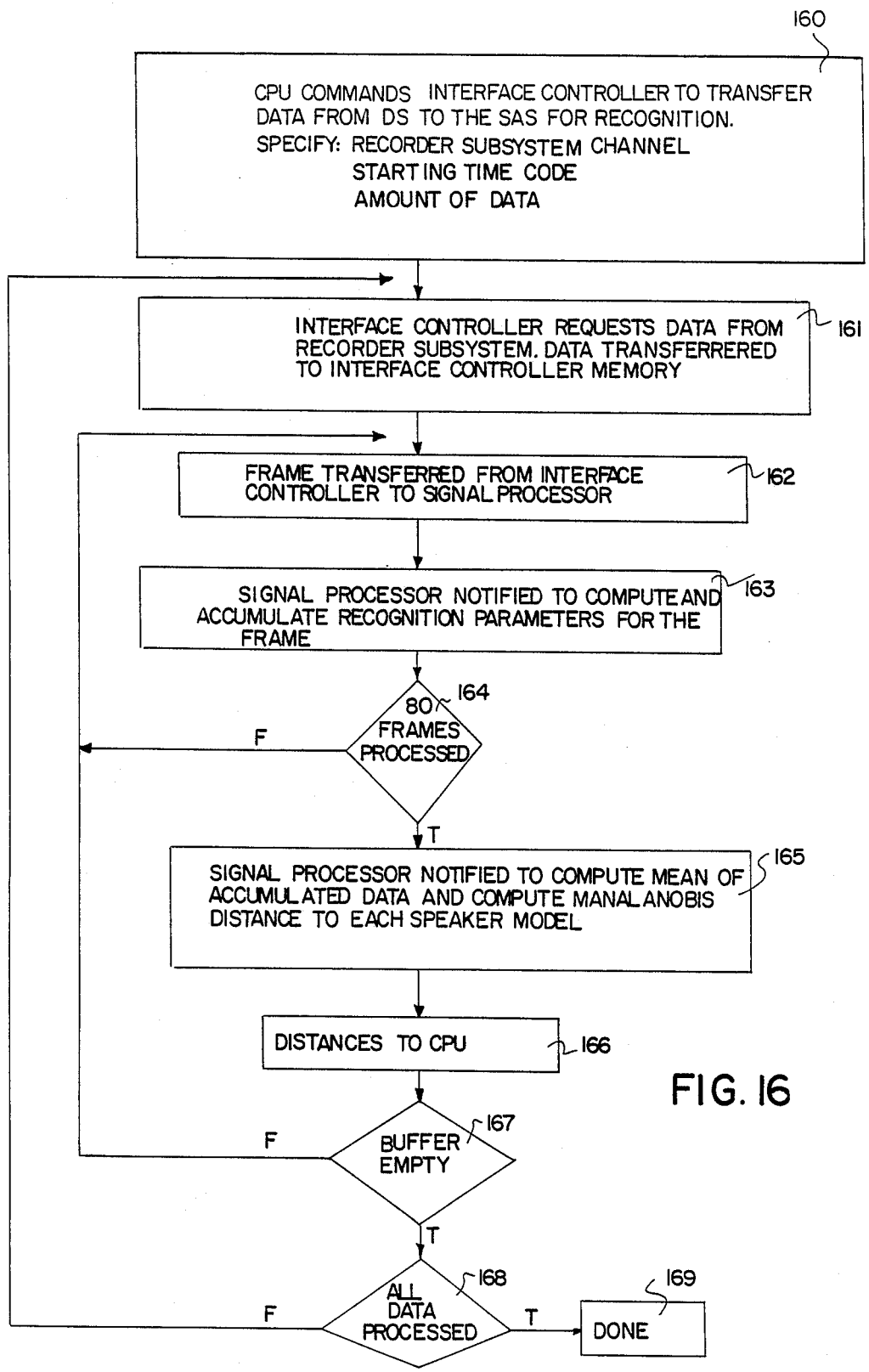
FIG. 16 is a flow chart in block diagram form showing speaker recognition from external digital data.

Referring to FIG. 16, there is shown a block diagram of this process. Essentially, the CPU commands the interface controller 61 to transfer data from for example the D.S. storage to the system for recognition. As indicated by module 160 of FIG. 16, the CPU specifies the recorder subsystem channel, the starting time code and the amount of data to be transferred.

The actual transfer of data from the digital subsystem to the system is accomplished using a pair of high speed interface controllers. One interface controller is shown as controller 64 and one is utilized in the D.S. recorder. See for example interface controller 64 of FIG. 5. The controllers are identical to the I/O control processors 61 used with the A/D and D/A converter subsystems. As with all functions in the system, the recognition mode is initiated by the CPU controlled software. The process of transferring data proceeds as follows and again can be ascertained by reference to FIG. 16. The CPU control software instructs the interface controller to begin transferring data from the recorder to the system.

These instructions are in the form of words written by the CPU into mail box registers in the interface controller 64. The commands specify the data to be transferred by giving the recorder subsystem channel and starting time code for the data as shown by module 160 in FIG. 20. The system requests data from the recorder subsystem via a serial port which exists between the interface controller 64 and the recorder subsystem control processor. The D.S. recorder subsystem which may be an Intel 8086 Single Board Processor but can employ other processors as well.

Essentially, only two commands are required for this interface. Once can employ a Transfer Start command and a Transfer Quit command. These commands indicate to the system when to start an output and when to stop an output. The interface controller issues the Transfer Start command to the recorder subsystem requesting that it start transferring from a particular channel N at a time T. The recorder subsystem control processor then schedules the appropriate disk controller in the recorder subsystem to transfer data from the specified disk into the recorders subsystem interface controller on-board memory.

Figure 17:
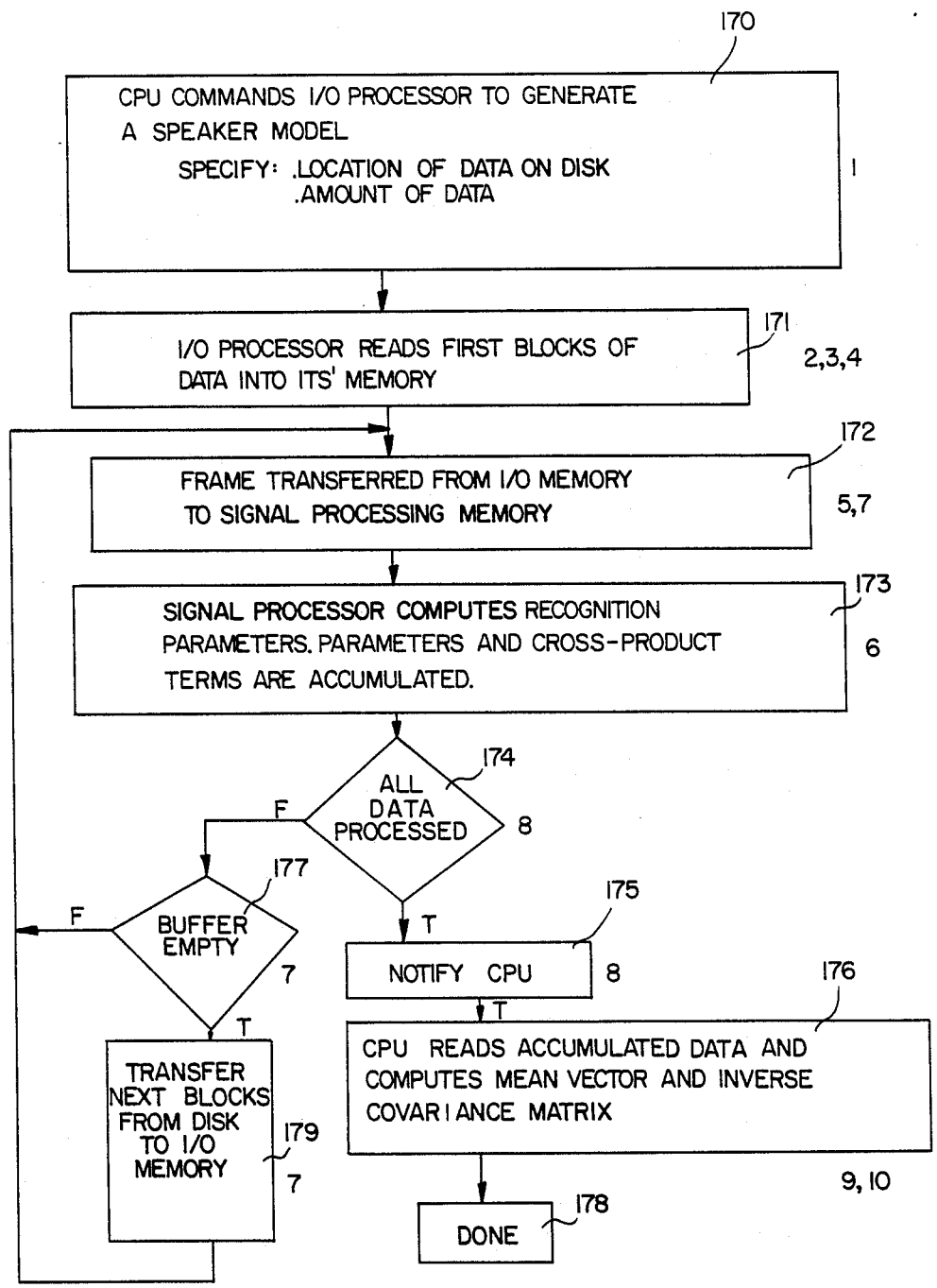
FIG. 17 is a flow chart depicting model generation in order to enable the system to implement speaker recognition.

The transfer of data as indicated above is without interfering with other data transfers that could be taking place concurrently. The model generation in order to enable recognition of a speaker is always employed using digital data stored on the disk 45. If reference is made to FIG. 17, there is shown a flow chart diagram format describing the process utilized. The model process is begun by having the CPU 40 control software issue a command to the I/O control processor 61 to generate a model using speech data contained in specified disk blocks (170). The I/O processor requests the use of the CPU disk controller to read the first blocks of model data (171). Then the CPU processor grants the I/O processor the use of the disk controller. The I/O processor includes a read command to the disk controller to read the next blocks of model data (171).

Once the transfer is completed, the I/O processor transfers data, one frame at a time to signal processing subsystem (172) and issues a command to accumulate model statistics. The signal processing subsystem 50 processes the current frame and accumulates the model statistics (173). The I/O control processor is notified via a register when the frame has been processed (174).

Figure 18:
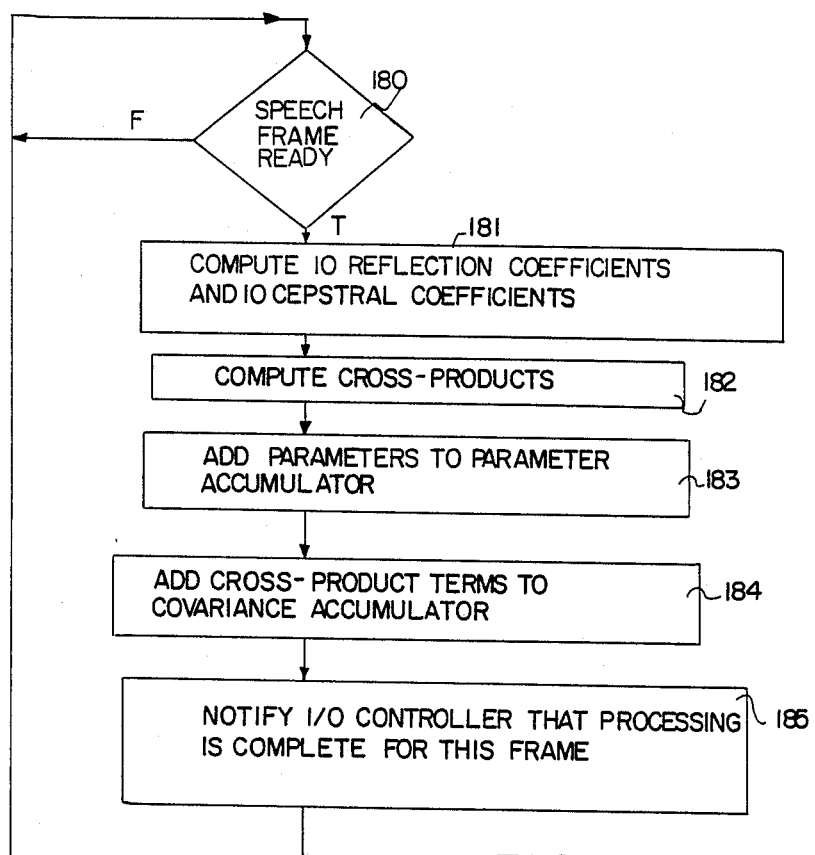
FIG. 18 is a flow chart depicting signal processor operation during model generation.

FIG. 18 shows a block diagram of the signal processor control flow during model generation. Essentially, the signal processing subsystem 50 possesses a current frame and accumulates the model statistics. The I/O control processor is notified via a register when a complete frame has been processed as indicated above by the signal processor (185). Then the I/O control processor upon receiving the done flag from the signal processing subsystems continues to send frames (180) to the signal processor reading new data from the disk as required. When all speech data has been processed the I/O control processor 61 notifies the CPU via the control software that the raw model parameters are available in the signal processor subsystem. The raw model parameters are then transferred from the signal processors of the system to the CPU processor.

Software in the CPU is then used to process the raw data to produce the required mean vector and covariance matrix for the model as described above. The model is then written into the disk along with the operator supplied label information and model name.

Figure 19:
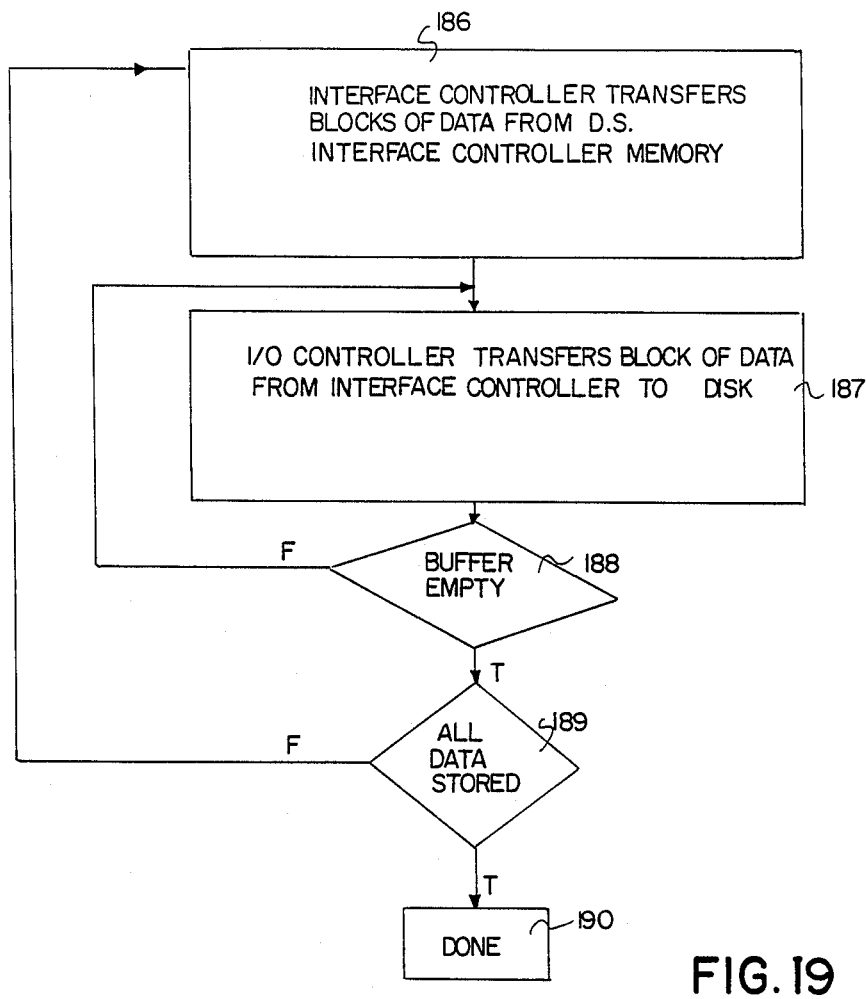
FIG. 19 is a flow chart showing the storing of speech data on a disk from an external source.

Referring to FIG. 19, there is shown a flow chart on how digitized speech data from a digital speech system may be transferred to enable the system to store such speech data on the system disk. It is of course understood that once the data is stored on the system disk then this data can be operated on by the CPU to produce speaker recognition. First the CPU instructs the interface controller 61 to transfer the data from the recorder subsystem to the on-board buffer memory in the interface controller in much the same way a this data is transferred to do recognition with digital data which was described in conjunction with FIG. 16 (186).

Next, the I/O controller is instructed to transfer data from the buffer to the disk (187) in much the same way as is done when live speech is digitized and stored on the disk.

Figure 20:
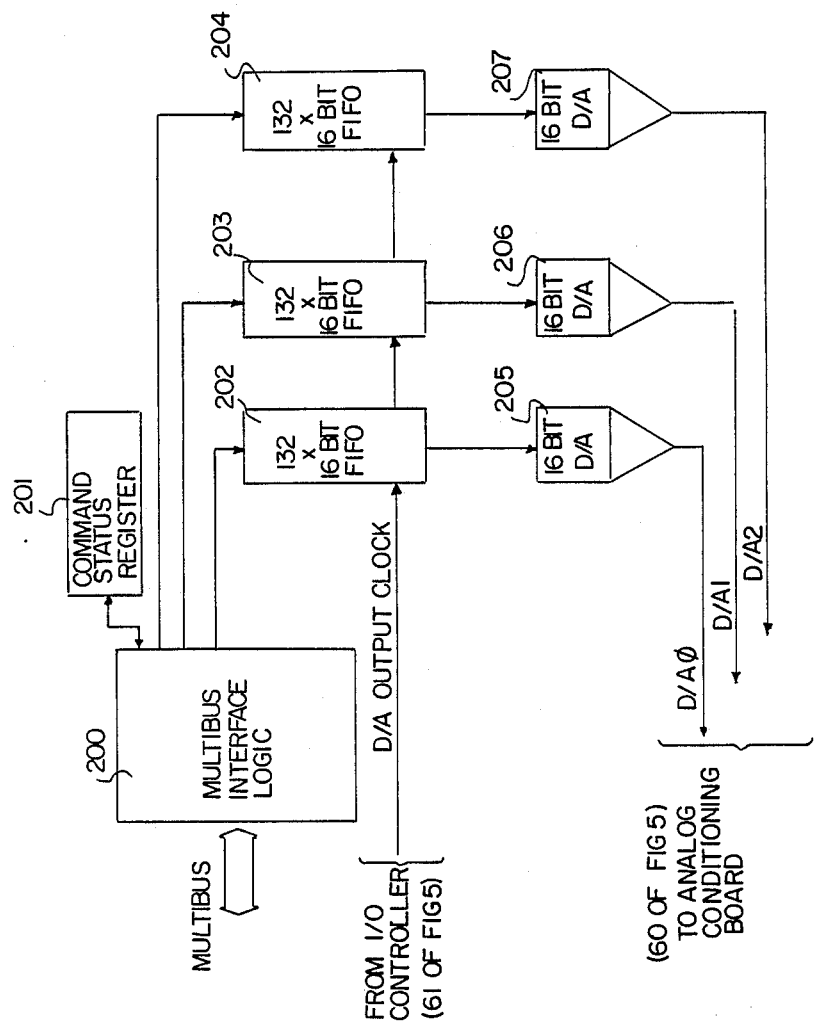
FIG. 20 is a block diagram of the digital-to-analog converter apparatus employed in this invention.

As shown in FIG. 19, this process continues until the desired data has been transferred. Referring to FIG. 20, there is shown a detailed block diagram of the D/A module 63 shown in FIG. 5. As shown in FIG. 5, the D/A analog converter interfaces with the main processor bus 42 via a interface logic module 200. These logic modules are well known and for example are made by many manufacturers. The interface logic 200 is coupled to a command status register in order to control the digital-to-analog converters. Each digital-to-analog converter is associated with a 132 by 16 bit FIFO as registers 202, 203, and 204 which are controlled from the I/O controller 61 as described above which essentially supplies the suitable clock to the D/A converters.

The output of each of the registers is coupled to respective 16 bit D/A converters as 205, 206, and 207. These are also well known devices. Essentially, as indicated, the use of the FIFO registers significantly reduces the overhead involved in transferring data from for example the A/D and D/A converters to the I/O controller since an entire 128 sample frame can be buffered on the converter boards and then read out as a block. This allows the I/O controller to be interrupted once every frame rather than once every sample. Both the D/A and A/D boards contain three independent converters and their associated FIFO's.

Figure 21:
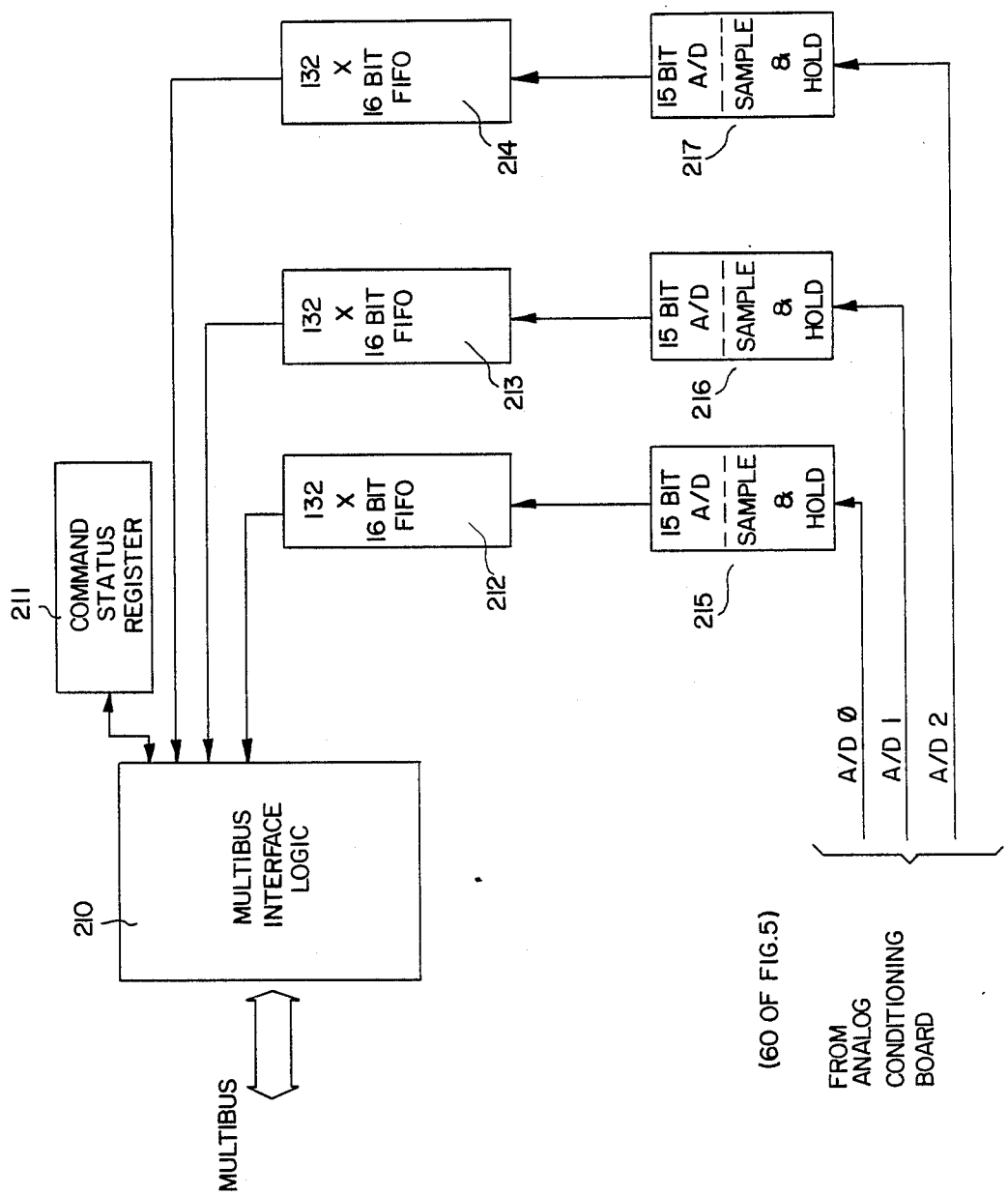
FIG. 21 is a block diagram of the analog-to-digital converter employed in this invention.

Referring to FIG. 21, there is shown a block diagram of the A/D converters as those indicated in block 62 of FIG. 5. The A/D converters chosen are complete 15 bit converter modules which are available from many manufacturers such as Analog Devices, Model No. DAS1153. These modules contain the 15 bit A/D converter, the sample and hold circuitry and all required clocks and references. The conversion time is 50 microseconds allowing sample rates as high as 20 KHz. As indicated, the D/A converters chosen are 16 bit converter modules as for example the Burr Brown Model PCM 52.

As seen from FIG. 21, the A/D converter contains a multibus interface logic 210 which is coupled to a status register, the A/D converters have three FIFO's, 212, 213, and 214, each of which is coupled to a A/D converter and a sample and hold circuit a 215, 216, and 217 and as shown in FIG. 21.

Figure 22:
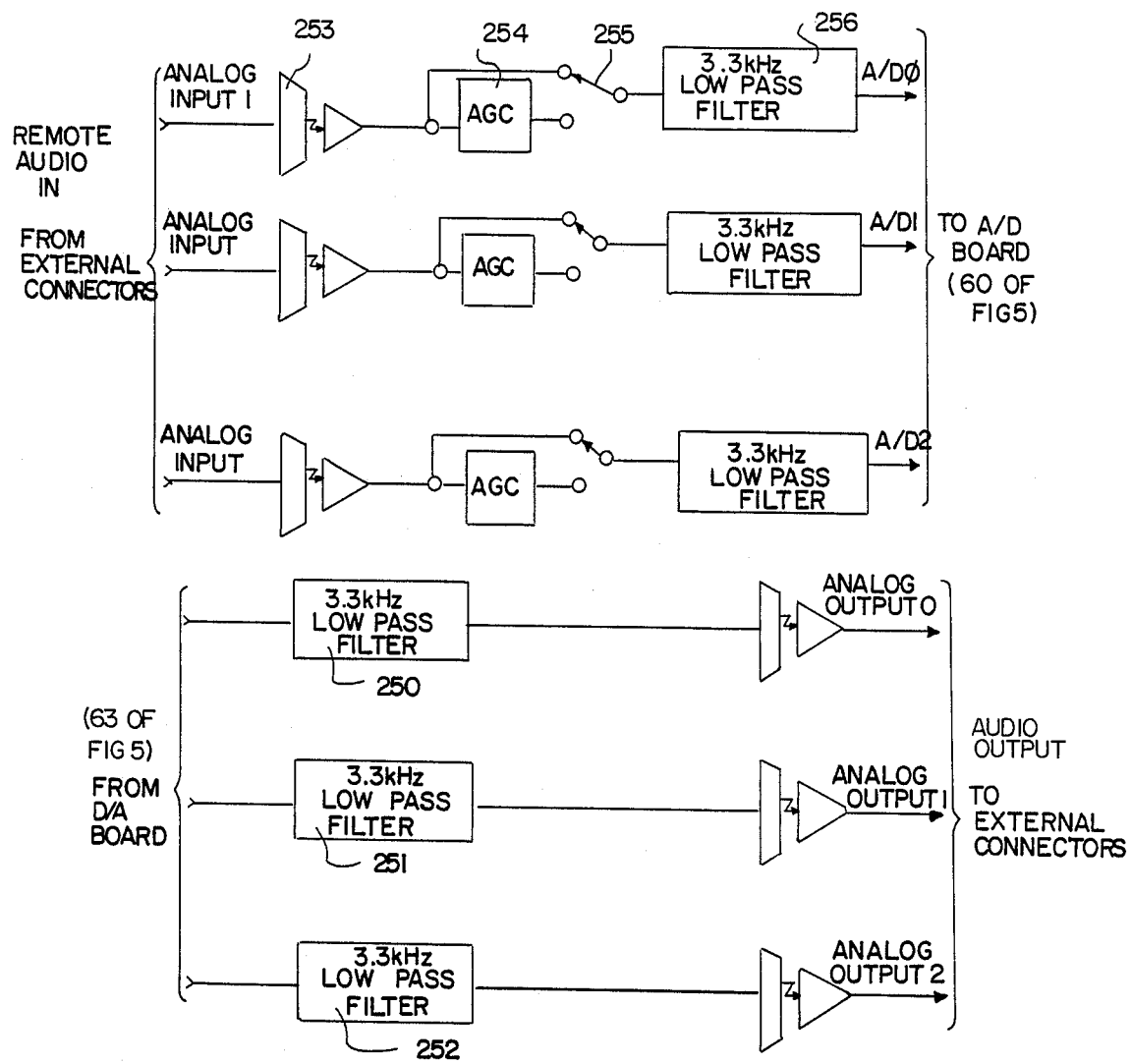
FIG. 22 is a block diagram depicting an analog conditioning board according to this invention.

Referring to FIG. 22, there is shown a block diagram of the analog conditioning board 60 of FIG. which as indicated in FIG. 1 interfaces with the A/D and D/A converters. The analog board contains the lowpass filters as filters 250, 251, and 252 which operate to filter the analog signal. These lowpass filters are then coupled to suitable amplifiers to provide the analog outputs which essentially interface with the inputs to the analog to digital converters as shown in FIG. 1.

Also shown are the signal inputs to the analog-to-digital converter board which essentially comprise an amplifier as amplifier 253 which is in series with an AGC circuit 254 and has a switch 255 enabling the same to operate either with or without AGC which output is coupled into a lowpass filter 256 to provide a signal to the analog-to-digital board. Thus, as shown in FIG. 22, the analog conditioning board 60 operates to provide inputs to the A/D board and to take inputs from the D/A board and to process them accordingly.

As is indicated, all the modules shown for example in FIG. 5 and described are available commercial modules. For example, CPU 40 or the main control processor is a 10 megaherz microprocessor board built by many manufacturers. An example of one manufacturer which supplies such a module is Sun Microsystems as the Sun 68000. The board is a multibus product that operates in conjunction with a 1.0 M byte main memory board. The disk memory subsystem as system 45 as shown in FIG. 5 can be implemented by a single 400 megabyte Winchester disk drive, or one can employ multiple smaller disks for the storage of speech data.

The disk may employ a Fujitsu 400 megabyte disk and a Xylogics 450 Multibus Disk Controller. The disk is designated by the manufacturer as a Fujitsu Eagle offers large capacity in a small package but also has extremely fast read and write access times which are needed. The seek times are 35 milliseconds maximum, 18 milliseconds average, and 5 milliseconds track to track. The Xylogic's controller is compatible with the disk and compatible with multibus operation.

The magnetic tape system can also be implemented by conventional components. A suitable tape disk is manufactured by a company called Cipher and employs a ½ inch tape drive. The system has multi-speed track operation and is capable of both 1,600 and 3,200 BPI recording. The I/O controller is a programmable device and is implemented with a microprocessor base single multibus board computer which is commercially available from SBE corporation as model M68K10. This is a high performance multibus compatible single word computer featuring a 10 megaherz 68000 microprocessor. It is designed for use in a large number of applications including a single CPU controller and a multibus system The same type of board is used for all the controllers in the system which interface with the I/O controller. The interface controller 64 also employs the SBE Model M 68K10 board. This unit offers more capability than a simple DMA controller card at nearly the same price. By using the same board for this subsystem as for the I/O controller and the other controllers, the number of different board types in the system is minimized. The signal subprocessing system 50 may employ an array processor which is capable of performing 16 bit fixed point arithmetic with 16 bit precision or floating point arithmetic with 16 bit Mantissa and 7 bit exponent control. Such modules are available from many sources such as Marinco, Inc. as the Marinco Model 8EB3024M Array Processor. This processor is implemented with a high speed arithmetic logic unit, a high speed 16×16 multiplier, an 8K by 24 bit data memory and a 2K by 48 bit program memory. The execution cycle time of the processor is 125 NANO seconds.

Essentially, as described above, the entire system uses conventional modules and based on the flow charts and block diagrams, one can immediately ascertain how the system operates and how the system can be programmed to perform the functions described. The system is used to identify unknown speakers in real time using small samples of this speech. The operator will be able to specify those speakers who are of interest at a particular time and the system will route to the operator only speech it identifies as spoken by specified talkers. The system has the capability of supplying second speaker identity and its associated likelihood to the operator for use in labeling and so on.

Prior to executing a recognition task, the system will be trained using 1 to 2 minutes of speech from each of the talkers who may later be recognized. The confidence level of the system in regard to identifying speakers is within an accuracy of 75 to 94 percent.

What is claimed is:

1. Speaker recognition apparatus for identifying a speaker by identifying the speech signal of an unknown speaker as one of a finite number of speakers comprising:

front end processing means responsive to said speech signal to provide digitized samples of said speech at an output, said front end processing means including lowpass filter means responsive to said speech signal to limit the band width thereof to about 3 KHz at an output of said filter means, storage means coupled to said processing means and having a first plurality of storage locations for storing said digitized samples, means included in said front end processing means and coupled to said storage means and responsive to said stored digitized samples for dividing said samples into frames, each frame containing a given number of samples, signal processing means included in said front end processing means and coupled to said logic means and responsive to said samples in said frame to provide at an output a series of speech parameters indicative of the nature of said speech content in each of said frames and including means for determining which of said frames contain speech by providing a smoothed histogram of the input energy in each of said frame to determine which of said frames contain speech according to said input energy, speaker modeling means coupled to said output of said signal processing means in a first selectable mode and operative to provide a model of speech characteristics for said speaker in said first mode, said signal modeling means including processor means responsive to said speech parameters within each speech frame to provide a covariance matrix indicative of said speech parameters and coupled to said storage means to store at a second plurality of locations said matrix to employ said matrix as a model during a second selectable mode of operation, speaker recognition means coupled to the output of said signal processing means in a second selectable mode operative to identify the speaker from the model which has been stored in said first mode and responsive to said parameters including comparison means for comparing the average current parameter with said stored speaker models during said speech frames as provided by said front end processing means, over a predetermined number of frames whereby a favorable comparison is indicative of a known speaker for which a model is stored, and means coupled to said output of said signal processing means for selecting either said first or second modes.

2. The speaker recognition system according to claim 1, further including analog-to-digital converter means having an input coupled to said low pass filter for providing at an output said digitized samples.

3. The speaker recognition system according to claim 2, wherein said samples are digitized at 8K samples per second with 16 bits per sample.

4. The speaker recognition system according to claim 3, wherein said storage means is a disk storage for storing said digitized samples.

5. The speaker recognition system according to claim 3, wherein said logic means includes means for reading said stored samples from said disk to provide a frame for a given number of stored samples and including Hamming window means providing a given number of samples for each frame.

6. The speaker recognition apparatus according to claim 1, wherein said signal processing means includes auto-correlation means responsive to said samples in said frames to provide a multi-point FAST FOURIER TRANSFORM (FFT) for each frame, including means for multiplying said FFT with a given transfer function to provide a power spectrum at the output and means responsive to said power spectrum to provide an inverse FFT, indicative of auto-correlation coefficients, a linear predictive code analyzer(LPC) means responsive to said auto-correlation coefficients for providing a first given number of said speech parameters indicative of reflection coefficients and a second given number of said speech parameters indicative of cepstral coefficients.

7. The speaker recognition apparatus according to claim 6, wherein said linear predictive code analyzer includes means for implementing an algorithm to provide ten reflection coefficients with means for recursively deriving each cepstral coefficients from said derived reflection coefficients.

8. Speaker recognition apparatus according to claim 1, wherein said comparison means includes means for calculating the Mahalanobis distance from said parameters and said stored parameters and to output a given number of low distances indicative of a speaker model as stored.

9. Speaker recognition apparatus according to claim 1, further including digital-to-analog converter means coupled to said front end processing means and operative to convert a digital speech signal to an analog speech signal for application as a speech signal to said processing means to enable processing of the same in either said first or second modes.

10. Speaker recognition apparatus according to claim 1, wherein said storage means, said logic means, and said signal processing means are coupled via a main processor bus.

11. A method of providing a model of the speech signal of a user to enable said model to be used subsequently to identify said speaker via said speaker's speech signal, comprising steps of:

digitizing said speech signal to provide at an output a plurality of digitized samples of said signal, storing said digitized samples, selecting a series of frames of samples as stored, computing auto-correlation coefficient for said samples in each of said frames, including providing a multi point fast fourier transform (FFT) from said samples in each of said frames, multiplying said FFT by a subband filter spectrum, calculating a power spectrum from said multiplied subband filter spectrum, providing an inverse FFT from said calculated power spectrum, deriving linear predictive code reflection coefficients from said auto-correlation samples, recursively deriving cepstral coefficients from said reflection coefficients, calculating a covariance matrix from said reflection and cepstral coefficients, and storing said matrix as a model of said speaker.

12. The method according to claim 11, wherein the step of digitizing said speech includes the steps of:

first passing said speech through a lowpass filter, then applying said passed speech to an analog-to-digital converter to obtain digitized samples.

13. The method according to claim 11, wherein the step of storing said digitized samples includes storing said samples on a disk memory.

14. The method according to claim 11, wherein the step of deriving said linear predictive code reflection coefficients includes providing ten coefficients using an algorithm for linear predictive coding.

15. The method according to claim 11, further including the step of:

detecting the energy content of each of said frames as stored to determine speech frames by providing a frame energy histogram for each frame.

16. The method according to claim 11, further including the step of:

calculating the Mahalanobis distance between said speech parameters and each of said matrixes as stored to determine the identity of a speaker from said distance and according to said model as stored, providing an output when said calculated distance is a lowest value for one of said matrixes as stored.

17. The method according to claim 16, further including the step of:

converting said distance to a speaker confidence level calculated according to said distance and having a value greater than 0.7.

18. The method according to claim 11, wherein said multi-point FFT is a 512 point zero filled FFT as calculated for each frame.

* * * * *